US008135432B2

(12) United States Patent
Pinder et al.

(10) Patent No.: US 8,135,432 B2
(45) Date of Patent: Mar. 13, 2012

(54) METHOD AND SYSTEM FOR MANAGING A COMMUNICATION LINK IN A COMMUNICATION NETWORK

(75) Inventors: Ellis A. Pinder, Davie, FL (US); Larry G. Brown, Royal Palm Beach, FL (US); Charles P. Schultz, N. Miami Beach, FL (US)

(73) Assignee: Motorola Solutions, Inc., Schaumberg, IL (US)

( * ) Notice: Subject to any disclaimer, the term of this patent is extended or adjusted under 35 U.S.C. 154(b) by 1119 days.

(21) Appl. No.: 11/958,751

(22) Filed: Dec. 18, 2007

(65) Prior Publication Data

US 2009/0153340 A1    Jun. 18, 2009

(51) Int. Cl.
*H04M 1/00* (2006.01)
(52) U.S. Cl. ............................. 455/550.1; 455/554.2
(58) Field of Classification Search ............ 455/550.1, 455/554.2
See application file for complete search history.

(56) References Cited

U.S. PATENT DOCUMENTS

| 5,184,120 | A | | 2/1993 | Schultz |
| 5,894,276 | A | * | 4/1999 | Altidor et al. ................. 455/566 |
| 6,266,515 | B1 | * | 7/2001 | Hazama ......................... 455/78 |
| 7,236,749 | B2 | * | 6/2007 | Reyes ............................ 455/78 |
| 7,721,968 | B2 | * | 5/2010 | Wigdor .................... 235/472.01 |
| 2002/0193080 | A1 | | 12/2002 | Komsi et al. |
| 2005/0245203 | A1 | * | 11/2005 | Vance ............................. 455/79 |
| 2006/0025122 | A1 | * | 2/2006 | Harris et al. ................. 455/419 |
| 2006/0073857 | A1 | * | 4/2006 | Hanabusa et al. ............ 455/572 |
| 2007/0040892 | A1 | * | 2/2007 | Aoki et al. ................. 348/14.01 |

FOREIGN PATENT DOCUMENTS

EP    1755292 A2    2/2007
JP    2007-142512 A  *  6/2007

OTHER PUBLICATIONS

Rekimoto, Jun et al.: SmartPad: A Finger-Sensing Keypad for Mobile Interaction, CHI 2003, Apr. 5-10, 2003, Ft. Lauderdale, Florida, USA, ACM 1-58113-637-4/02/0004, 2 pages.
PCT International Search Report Dated Feb. 11, 2009.

* cited by examiner

*Primary Examiner* — Rafael Pérez-Gutiérrez
*Assistant Examiner* — Liton Miah
(74) *Attorney, Agent, or Firm* — Brian M. Mancini; Anthony P. Curtis; Daniel R. Bestor

(57) ABSTRACT

A method and apparatus for managing a communication link in a communication network are provided. A continuous actuation button is configured to initiate a communication link between communication devices. The communication link is initiated when a force applied on the continuous actuation button exceeds a first force threshold. The force applied on the continuous actuation button is sampled at periodic time intervals. A release event of the continuous actuation button is detected when the force applied on the continuous actuation button reaches a second force threshold. The communication link is maintained for a predefined period of time after detecting the release event based on whether the sampled force indicates that the release event was unintentional. The predefined period of time is sufficient to allow a user to take action to avoid disconnection if undesired.

18 Claims, 15 Drawing Sheets

METHOD AND SYSTEM FOR MANAGING A COMMUNICATION LINK IN A COMMUNICATION NETWORK

FIELD OF THE INVENTION

The present invention relates, in general, to communication networks, and more specifically, to a method and system for managing a communication link in a communication network.

BACKGROUND OF THE INVENTION

In recent years, communication networks have become popular due to the increasing need for exchange of information and data. A communication network includes communication devices that facilitate communication and exchange of data. Examples of communication devices include, but are not limited to, mobile phones, two-way hand-held radios, Personal Digital Assistants (PDAs), laptops and computers. These communication devices are linked to each other through communication paths for transmitting/receiving data. The communication paths can be wired or wireless communication paths. Examples of wired communication paths include optical fiber links, Ethernet cable links, and the like. Examples of wireless communication paths include radio-frequency (RF) paths, satellite communications paths, and the like.

The communication paths can operate using different modes of operation, for example, a full duplex mode and a half duplex mode. In the full duplex mode of operation, the data is transmitted between the communication devices in both directions at the same time. For example, in case of mobile phones, users can use the mobile phones to communicate simultaneously with each other. However, in the half duplex mode of operation, only unidirectional data transmission is possible between the communication devices at a time. The half duplex mode is used in different communication devices, for example, walkie-talkies, communication devices with Push-to-Talk (PTT) features, and the like, for transmitting/receiving data. The communication devices with PTT features transmit/receive data using a radio frequency or a channel. The data is transmitted to one or more recipients by pressing a button, usually a PTT button. A communication link is established between the user and the one or more recipients when the button is pressed by the user.

To maintain this communication link, the user needs to press and hold the button continuously. However, due to fatigue of holding the button continuously, the user may accidentally release the button, and thus break the communication link. Sometimes, the user may be unaware of this break in the communication link and may continue talking, which would disrupt the communication between the user and the recipients. Also, the communication link would need to be re-established to transmit data to the recipients. However, during peak periods of PTT feature usage, the process of re-establishment of the communication link could be highly delayed.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
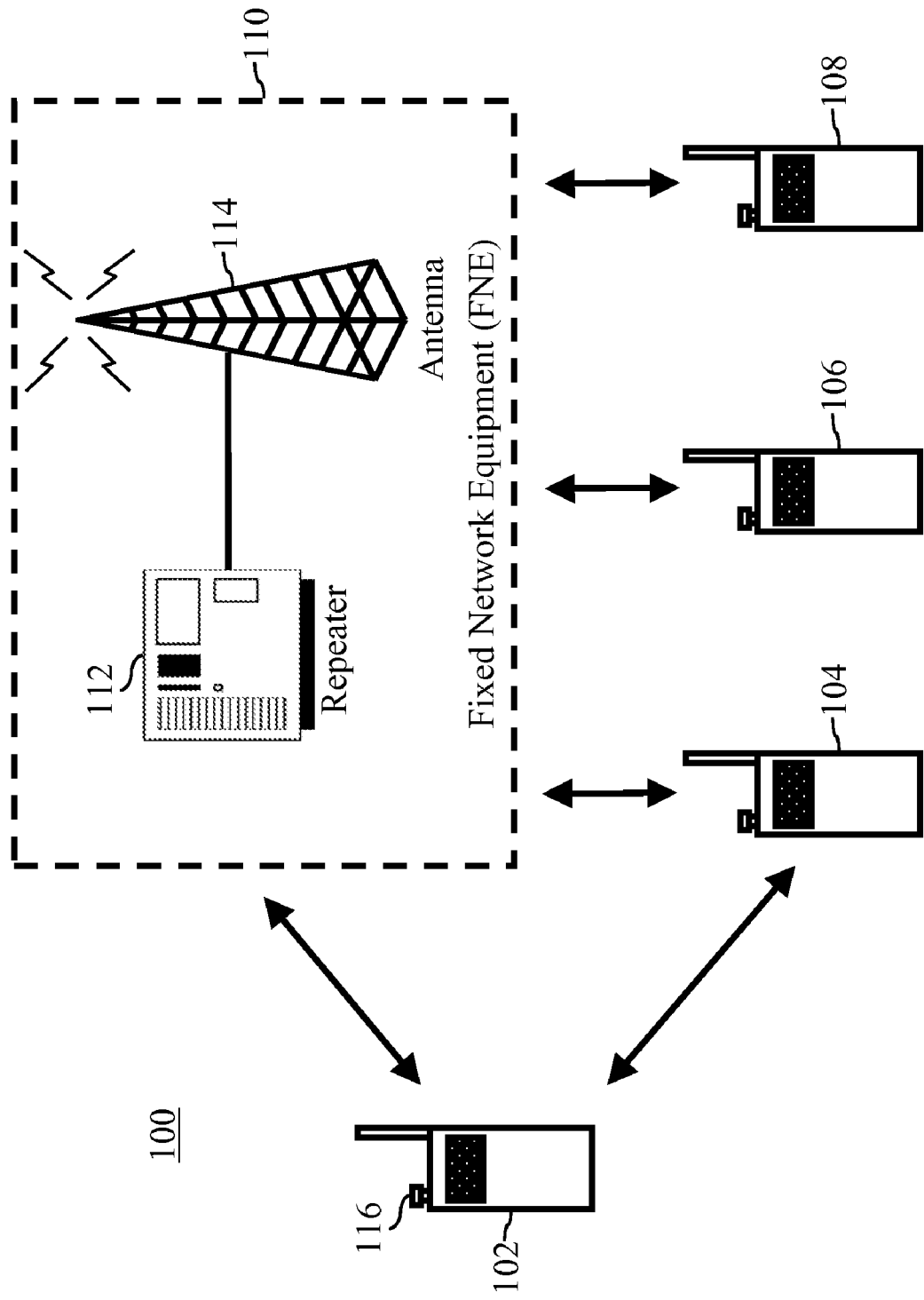
FIG. 1 illustrates an exemplary communication network, where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention. In addition, these figures are only logical blocks and do not represent physical forms.

DETAILED DESCRIPTION

Before describing in detail the particular method and system for managing a communication link in a communication network, in accordance with various embodiments of the present invention, it should be observed that the present invention resides primarily in combinations of method steps related to the method and system for managing a communication link in the communication network. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms "comprises," "comprising," or any other variation thereof, are intended to cover a non-exclusive inclusion, such that a process, method, article or apparatus that comprises a list of elements does not include only those elements but can include other elements not expressly listed or inherent in such a process, method, article or apparatus. An element proceeded by "comprises ... a" does not, without more constraints, preclude the existence of additional identical elements in the process, method, article or apparatus that comprises the element. The term "another," as used in this document, is defined as at least a second or more. The term "includes," as used herein, is defined as comprising. The term "data" is defined as information that is transportable over a communication link. The information can be of various kinds including voice. A "communication link" is defined as any connection that supports an active exchange of communication signals between two or more communication devices. The phrase "maintaining the communication link" is defined as keeping a communication device in an active transmit state for a period of time. This phrase includes, but is not limited to, an instance where a user unintentionally releases a mechanism that is used to enable the communication device to transmit signals. The term "coupled" is defined as connected, although not necessarily directly and not necessarily mechanically, and includes a configuration where one or more components are integrated with one or more other components.

For an embodiment, a method for managing a communication link in a communication network is provided. The method enables exchange of data between a first communication device and at least one second communication device in the communication network. The method includes providing a continuous actuation button that is configured to initiate the communication link. Further, the method includes initiating the communication link when a force applied on the continuous actuation button exceeds a first force threshold. Moreover, the method includes sampling the force applied on the continuous actuation button at periodic time intervals. Furthermore, the method includes detecting a release event of the continuous actuation button when the force applied on the continuous actuation button reaches a second force threshold. The method also includes maintaining the communication link for a predefined period of time after the release event of the continuous actuation button is detected. The communication link is maintained, based on the sampled force.

For another embodiment, a communication device for managing a communication link in a communication network is provided. The communication device enables exchange of data between a first communication device and at least one second communication device in the communication network. The communication device includes a continuous actuation button that is configured to initiate the communication link. The communication device also includes a user fatigue sensor that is coupled with the continuous actuation button. The user fatigue sensor is configured to detect a release event at the continuous actuation button. The communication device also includes a processing device that is configured to sample force applied on the continuous actuation button at periodic time intervals. The processing device is also configured to maintain the communication link for a predefined period of time, based on the sampled force.

For yet another embodiment, a continuous actuation button for exchanging data between a first communication device and at least one second communication device in a communication network is provided. The continuous actuation button includes a user fatigue sensor configured to detect a release event at the continuous actuation button. The continuous actuation button also includes a processing device. The processing device is configured to sample force applied on the continuous actuation button at periodic time intervals. Further, the processing device is configured to maintain a communication link for a predefined period of time based on the sampled force.

FIG. 1 illustrates a communication network 100, where various embodiments of the present invention can be practiced. The communication network 100 shows a plurality of communication devices interacting with each other. The communication devices can be used to exchange data and information with other communication devices present in the communication network 100. Examples of the data exchanged can include, but are not limited to, voice data, digital data, video data, audio data, and textual data. The communication devices are spread over a predefined area in the communication network 100. Depending on this predefined area, the communication network 100 can be classified as a Personal Area Network (PAN), a Local Area Network (LAN), a Wide Area Network (WAN), a Metropolitan Area Network (MAN), and the like. Examples of communication devices include, but are not limited to, mobile phones, hand-held two-way radio devices, Fixed Network Equipments (FNEs), VOIP phones, personal computers, laptops, devices that transmit and/or receive communication signals over landline connections and Personal Digital Assistants (PDAs). FNEs are devices that have a fixed location and are not mobile, for example, a radio communication station.

For the purpose of this description, the communication network 100 is shown to include a first communication device 102, a second communication device 104, a third communication device 106, a fourth communication device 108 and a fifth communication device 110. Hereinafter, the first communication device 102, the second communication device 104, the third communication device 106, the fourth communication device 108 and the fifth communication device 110 are collectively referred to as communication devices 102-110. The first communication device 102 is linked to the communication devices 104-110 through communication paths. The communication paths can be wired communication paths or wireless communication paths. Examples of wired communication paths include optical fiber links, Ethernet cable links, etc. Examples of wireless communication paths include radio frequency links, satellite communications links, etc. The communication paths facilitate exchange of data between the communication devices 102-110. The data exchanged through the communication paths can be, for example, an audio data, a visual data, a textual data and any suitable combination thereof For one embodiment, the fifth communication device 110 can be a Fixed Network Equipment (FNE). The FNE 110 can include a repeater 112 and an antenna 114. The repeater 112 can, for example, amplify the data The communication devices 102-110 can exchange data amongst each other by using a half duplex mode of operation or a full duplex mode of operation. In the half duplex mode of operation, unidirectional data communication is possible between the communication devices at one time. The half duplex mode of operation can be in the form of a Push-to-Talk (PTT) feature to exchange the data. The PTT feature uses a predefined radio frequency/channel through which the data is exchanged. The predefined radio frequency/channel is tuned in manually or automatically when the PTT feature is activated at any one of the communication devices 102-110.

The first communication device 102 includes a PTT button 116 to activate the PTT feature. The PTT feature is activated to establish a communication link between the first communication device 102 and the other communication devices 104-110. The ability to transmit over the communication link remains established until the PTT button 116 is released. The communication link is established by the first communication device 102 to transmit data to the communication devices 104-110.

In an embodiment, the first communication device 102 can also receive data from any one of the communication devices 104-110. Further, the PTT button 116 can also be present in any of the communication devices 102-110 to transmit data and information to the other communication devices.

Figure 2:
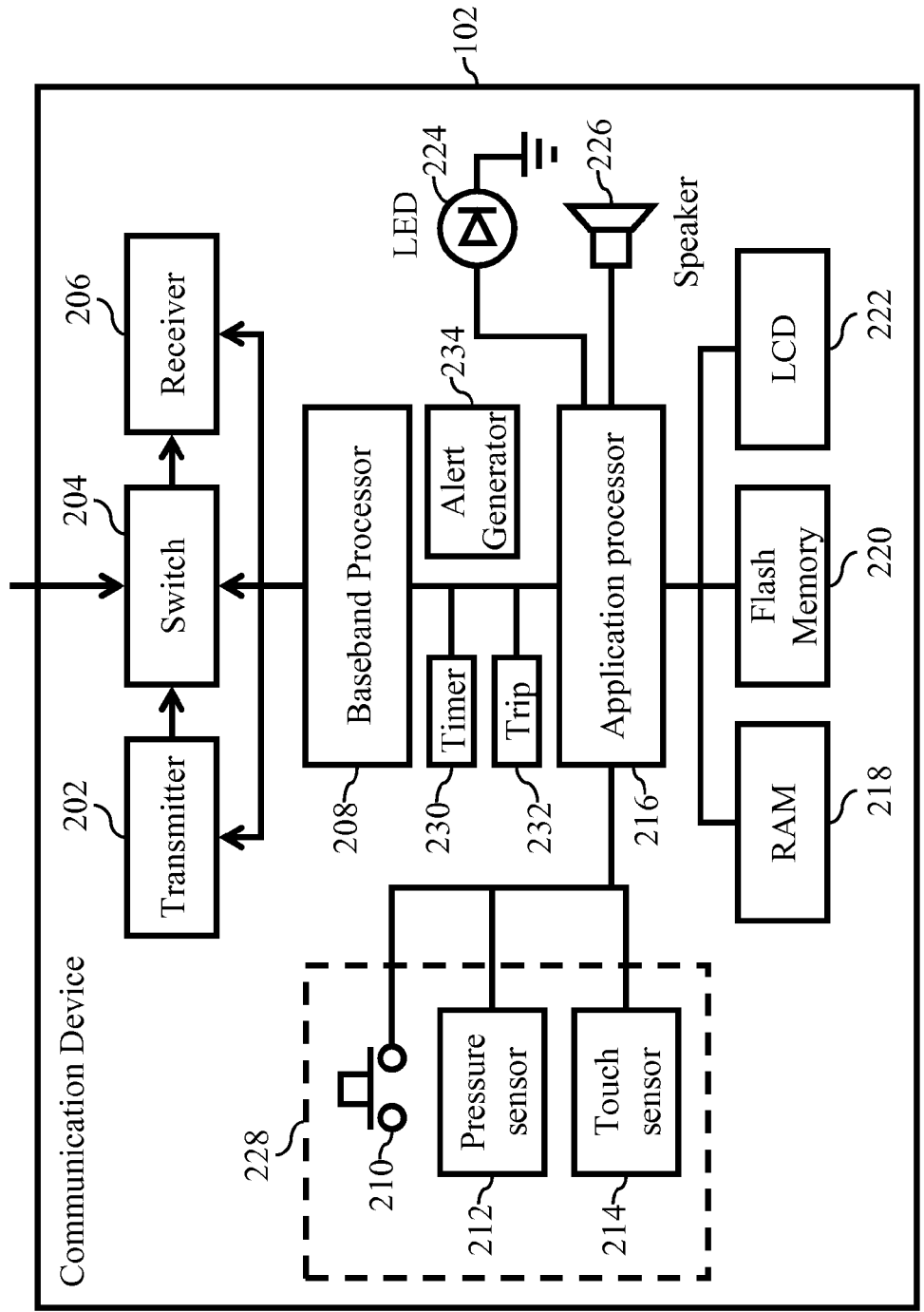
FIG. 2 illustrates a block diagram of a communication device, in accordance with an embodiment of the present invention.

FIG. 2 illustrates a block diagram of the communication device 102, in accordance with various embodiments of the present invention. It will be apparent to those ordinarily skilled in the art that the communication device 102 can include all or even a fewer number of components than the components shown in FIG. 2. Further, those ordinarily skilled in the art will understand that the communication device 102 can include additional components that are not shown here, since they are not germane to the operation of the communication device 102. To describe the communication device 102, reference is made to FIG. 1 although it should be understood that the communication device 102 can also be implemented in any other suitable environment or network.

The communication device 102 enables exchange of data between the communication device 102 and the communication devices 104-110. The communication device 102 initiates a communication link to transmit data to the communication devices 104-110.

The communication device 102 includes a continuous actuation button 210, a user fatigue sensor 228 and a processing device 216. The continuous actuation button 210 is defined as any mechanism that is configured to permit a user to initiate and/or maintain the communication link. For example, force is applied on the continuous actuation button 210 by a user of the communication device 102 to initiate the communication link. The communication link is initiated when the force applied by the user on the continuous actuation button 210 reaches a first force threshold. The first force threshold is the amount of force required to be exerted on the continuous actuation button 210 to initiate the communication link. For example, audio data can be exchanged by a user of the first communication device 102 with the communication devices 104-110 by applying a force on the continuous actuation button 210 that exceeds the first force threshold. Although the continuous actuation button 210 and the user fatigue sensor 228 are shown as being contained within the communication device 102, the arrangements herein are not so limited. These components may be located in other suitable devices, such as wireless accessories that may communicate with the communication device 102.

In one arrangement, the user fatigue sensor 228 is integrated with the continuous actuation button 210. Further, the user fatigue sensor 228 is configured to detect a release event at the continuous actuation button 210. For one embodiment, the user fatigue sensor 228 can include a pressure sensitive device 212. The pressure sensitive device 212 can be coupled to the continuous actuation button 210. The pressure sensitive device 212 can determine the pressure or force applied by a user on the continuous actuation button 210. The force is monitored by using the pressure sensitive device 212 and a press event is detected when the force applied by the user exceeds the first force threshold. The pressure sensitive device 212 signals the processing device 216 about the occurrence of the press event to enable the initiation of the communication link. Thereafter, when the data through the communication link has been transmitted, the user may release the force applied on the continuous actuation button 210 to discontinue the communication link. In an exemplary scenario, discontinuation of the communication link can imply that other devices are now allowed to transmit over the communication link. The pressure sensitive device 212 senses the reduced force on the continuous actuation button 210 and signals the processing device 216 to discontinue the communication link. For one embodiment, the processing device 216 may be signaled to discontinue the transmission from the communication device 102 over the communication link. This case happens when the user intentionally releases the continuous actuation button 210 to discontinue the link. In another case, when the pressure on the continuous actuation button 210 reduces due to user fatigue, the pressure sensitive device 212 detects the reduced force, which may eventually drop to a second force threshold. In this case, the pressure sensitive device 212 informs the processing device 216 about the reduced force, which may generate an alarm that is perceptible by the user of the first communication device 102. The alarm can be a text message or an alarm ring-tone indicating that the user eventually may not be able to transmit over the communication link in view of an accidental release of the continuous actuation button 210.

For another embodiment, the user fatigue sensor 228 can include a touch sensitive device 214. The touch sensitive device 214 can be coupled to the continuous actuation button 210. The touch sensitive device 214 can determine whether a user is touching the continuous actuation button 210. A touch event can be registered when it is determined that the user is touching the touch sensitive device 214. In an exemplary scenario, the touch event may be used to trigger the press event to initiate the communication link. After transmitting the data, the user releases the continuous actuation button 210. The touch sensitive device 214 then detects the release event based on whether the finger of the user is in contact with the continuous actuation button 210 or not. For example, the touch sensitive device 214 will detect the release event when the user moves his/her finger away from the continuous actuation button 210.

For yet another embodiment, the user fatigue sensor 228 can include a combination of the pressure sensitive device 212 and the touch sensitive device 214. The press event can be detected by the pressure sensitive device 212 based on the force applied on the continuous actuation button 210. The release event can be detected by either the pressure sensitive device 212 or the touch sensitive device 214, or both. The pressure sensitive device 212 detects the release event based on the force applied on the continuous actuation button 210 while the touch sensitive device 214 detects the release event based on the touch or proximity of the finger on or to the continuous actuation button 210.

The processing device 216, through the pressure sensitive device 212, can be configured to sample the force applied on the continuous actuation button 210 at, for example, periodic time intervals. The processing device 216 can also be configured to maintain the communication link for a predefined period of time based on the sampled force. The processing device 216 can also be referred to as an application processor 216. For one embodiment of the present invention, the application processor 216 can be coupled to the user fatigue sensor 228 and consequently with the continuous actuation button 210, the pressure sensitive device 212 and the touch sensitive device 214. The application processor 216 can obtain the force applied on the continuous actuation button 210 from the pressure sensitive device 212. The force can be sampled by the application processor 216 at periodic time intervals. The sampling of the force can include comparison of the force to threshold values, storing the force for further reference, analyzing the sampled force values and the like. The periodic time intervals may be predefined or customizable. The sampling is performed by the application processor 216, for example, when the press event is determined by the user fatigue sensor 228. The sampling is performed until, for example, the release event is detected. Thereafter, based on the sampling of the force, the communication link can be maintained by the application processor 216 for a predefined period of time following the occurrence of the release event. For example, in case the sampling of the force indicates fatigue release of the continuous actuation button 210, then the communication link will be maintained by the application processor 216. The predefined period of time can be user-defined.

Further, the application processor 216 can be configured to record a log of the force applied on the continuous actuation button 210 at periodic time intervals. The log can be used by the application processor 216 to analyze the trend of the force applied with time. As an example, the analysis is performed when the release event is detected by the user fatigue sensor 228. The application processor 216 then determines whether to maintain the communication link for a predefined period of time, based on the analysis.

For one embodiment, the communication link is maintained when the analysis of the force applied indicates release of the continuous actuation button 210 due to fatigue, i.e., the release is unintentional. The release of the continuous actuation button 210 due to fatigue can be identified by the trend of the force applied with time. A gradual decrease in the force applied over time can indicate the case of release due to fatigue. On the other hand, a sudden decrease in the force applied can indicate intentional release by the user. In case intentional release is indicated by the analysis, the communication link is discontinued (i.e., no longer maintained) by a trip 232, that is operatively coupled with the application processor 216.

The application processor 216 can also be configured to determine whether to use the pressure sensitive device 212 or the touch sensitive device 214 for detecting the release event. The determination is customized based on the user of the communication device 102. For example, the pressure sensitive device 212 can be used to detect the release event when the user is wearing gloves and the touch sensitive device 214 can be used to detect release event when the user is not wearing gloves or otherwise bare-handed. As noted above, however, the use of both the pressure sensitive device 212 and the touch sensitive device 214 to determine whether a release is unintentional is available.

For one embodiment, the communication device 102 can also include a transmitter 202, a switch 204, a receiver 206 and a baseband processor 208. The transmitter 202 can send signals to the other communication devices 104-110. In an exemplary scenario, the signals can be in the form of Radio Frequency (RF) signals. The signals can contain data or information which is to be transmitted to the communication devices 104-110. The first communication device 102 can also receive signals from communication devices 104-110. The signals can be received by the receiver 206. The receiver 206 can be coupled to the transmitter 202 through the switch 204, which can be used to enable half-duplex communications, as is known in the art. The signals received from the receiver 206 can be processed at the baseband processor 208. The baseband processor 208 can also be configured to process the signals to be sent via the transmitter 202. The baseband processor 208 can be coupled to the transmitter 202, the switch 204 and the receiver 206. The baseband processor 208 can be configured to convert the signals into baseband signals. The baseband processor 208 can also be configured to convert the baseband signals into other signals, for example, RF signals. The baseband processor can be coupled to the application processor 216. The baseband processor 208 can receive data to be sent via the transmitter 202 from the application processor 216. Further, the baseband processor 208 can be configured to forward the signals received via the receiver 206 to the application processor 216, after processing. For one embodiment, the communication device 102 can also include a Random Access Memory (RAM) 218, a flash memory 220, and a Liquid Crystal Display (LCD) 222, although other suitable memory and display technologies may be employed here.

The application processor 216 can be coupled to the Random Access Memory (RAM) 218, the flash memory 220, and the Liquid Crystal Display (LCD) 222. The RAM 218 can record the log of force sampled at periodic time intervals. The log is recorded at the RAM 218 when the sampling is performed by the application processor 216. The RAM 218 provides the recorded log of sampled force to the application processor 216 to perform the analysis of the force applied on the continuous actuation button 210. The sampled force recorded at periodic time intervals can be analyzed by the application processor 216 to determine the nature of release of the continuous actuation button 210. The sampled force can also be stored in the flash memory 220 for further reference.

The LCD 222 can display a frequency or channel at which the communication devices 102-110 are communicating or a user or group identification. The LCD 222 can also display critical parameters related to the communication that is taking place at the communication device 102.

For one embodiment, the communication device 102 can also include a Light Emitting Diode (LED) 224 and a speaker 226. The application processor 216 can be coupled to the Light Emitting Diode (LED) 224 and the speaker 226. The LED 224 can alert the user of the communication device 102 about ongoing transmission of signals to the other communication devices 104-110. The signals received from the other communication devices 104-110 can be processed at the baseband processor 208 and then sent to the speaker 226 through the application processor 216. The speaker 226 plays the audio data processed by the baseband processor 208 and application processor 216. The LED 224 and the speaker 226 can also be used to alert a user of the occurrence of a release event, when it is determined that the release occurred due to fatigue. It is understood, however, that other suitable devices may be used to alert the user of the communication device 102, such as a vibration mechanism.

For one embodiment, the communication device 102 can include a timer 230. As an example, the timer 230 can be operatively coupled with the application processor 216. The timer 230 can measure the duration for which the communication link has to be maintained. The timer 230 is activated, for example, when the release event is detected by the user fatigue sensor 228. The timer 230 can also be used to obtain time stamps for the sampled force. These time stamps can be used by the application processor 216 to analyze the sampled force with respect to time.

For another embodiment, the communication device 102 can include an alert generator 234. The alert generator 234 can alert a user of the communication device 102 regarding the release event. The user of the communication device 102 can be alerted to indicate the occurrence of release due to fatigue. On detecting the alert, the user can increase the force on the continuous actuation button 210 to maintain the communication link. Examples of the alert generator 234 can include but are not limited to an audio alert device, a vibratory or tactile alert device, a visual alert device and an audio-visual alert device.

Figure 3:
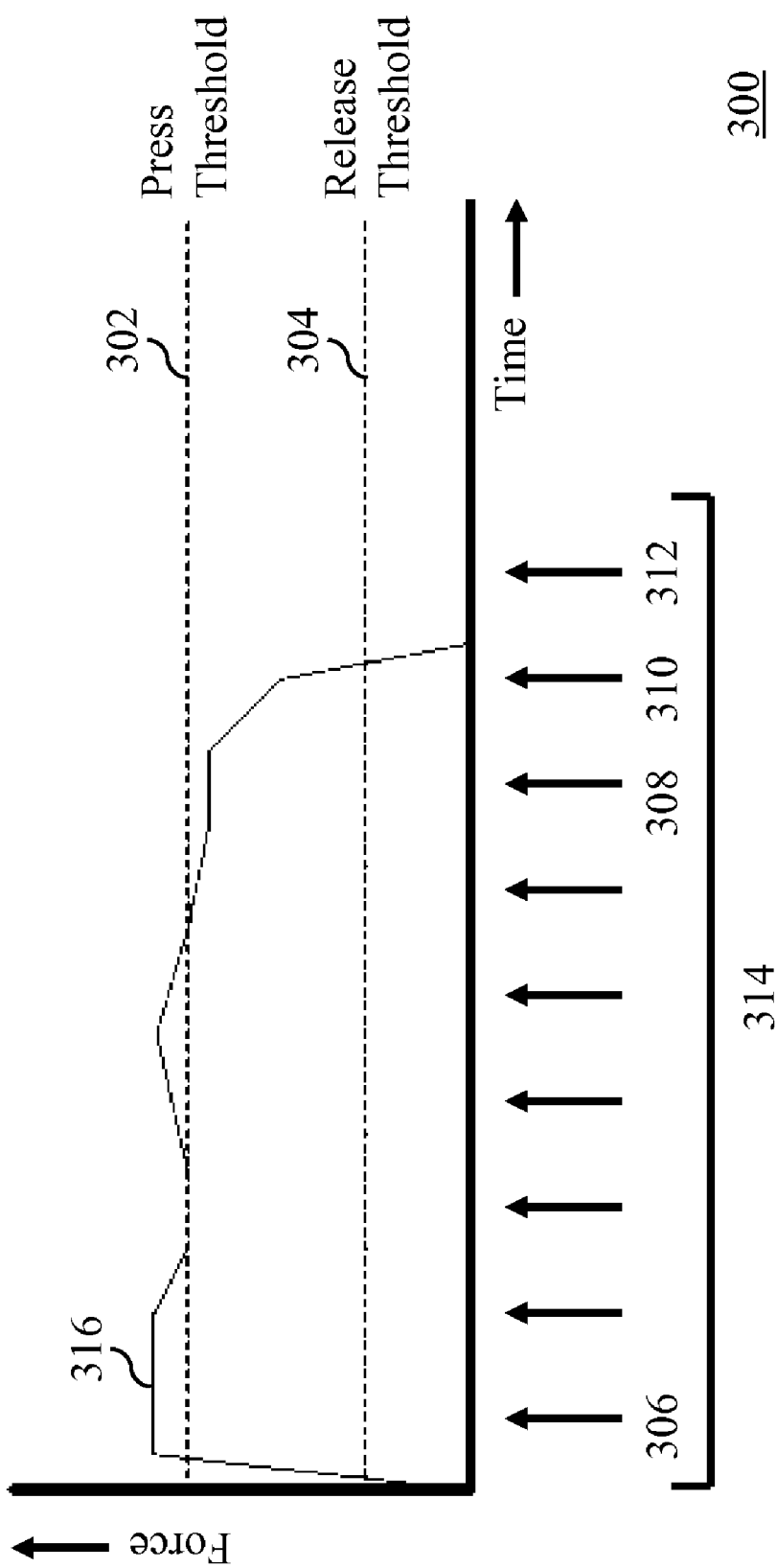
FIG. 3 shows a graph of a force applied on the continuous actuation button with respect to time in case of intentional release, in accordance with an embodiment of the present invention.

FIG. 3 shows a graph 300 of a force applied on the continuous actuation button 210 with respect to time in case of intentional release, in accordance with an embodiment of the present invention. Those ordinarily skilled in the art would appreciate that the graph 300 can be represented in various other ways, different than that shown in FIG. 3. To describe the graph, reference will be made to FIG. 1 and FIG. 2.

The graph 300 shows a plot 316 of the force applied on the continuous actuation button 210 with time. The force applied is represented on the vertical axis and time on the horizontal axis. The graph 300 includes a press threshold 302 and a release threshold 304 on the vertical axis. The press threshold 302 corresponds to the first force threshold that is used to trigger a press event. The release threshold 304 corresponds to a second force threshold that is used to trigger a release event. For one embodiment, the press threshold 302 can be more than the release threshold 304. For another embodiment, the press threshold 302 can be equal to the release threshold 304. The graph 300 also includes an arrow 306, an arrow 308, an arrow 310, an arrow 312 and other arrows, collectively referred to as arrows 314. The arrows 314 represent time instants at which the force applied on the continuous actuation button 210 has been sampled. In one arrangement, the adjacent time instants differ by a periodic time interval, although the duration of each time interval does not necessarily have to be equal. For one embodiment, the values of force applied may be obtained from a log of the force applied on the continuous actuation button 210.

As can be seen from the plot 316, at arrow 306 the force applied becomes more than the press threshold 302 thus triggering the press event. When the press event is triggered, the continuous actuation button 210 initiates the communication link. Thereafter, in the time period between arrow 306 and arrow 308, the force applied remains at or above the press threshold 302. Consequently, the communication link also remains active during that time period. However, at arrow 308, the force applied starts to fall and goes below the press threshold 302. The force further decreases at arrow 310, almost reaching the release threshold 304. Thereafter, between arrow 310 and arrow 312, the force applied reaches the release threshold 304, triggering the release event. As soon as the release event is triggered, the application processor 216 analyzes the log of the sampled force with respect to time. Examples of the analysis can include determining of the slope of the plot 316 before the release event, determining a percentage change in the force applied over the last two time instants and various other analyses. The determined value can be compared to a threshold value to determine whether the release was intentional or due to fatigue. As seen in FIG. 3, there is a sudden drop in the force applied after arrow 308. Hence, the slope of the plot 316 between arrows 308 and 310 will be greater than the threshold value for slope. Therefore, the release occurring in FIG. 3 can be classified by the application processor 216 as an intentional release, and hence, the communication link is discontinued. At arrow 312, the force applied is zero and remains zero thereafter. This process can be repeated for subsequent press and release events, and the press and release threshold values can be the same or vary from values employed for previous press and release events.

Figure 4:
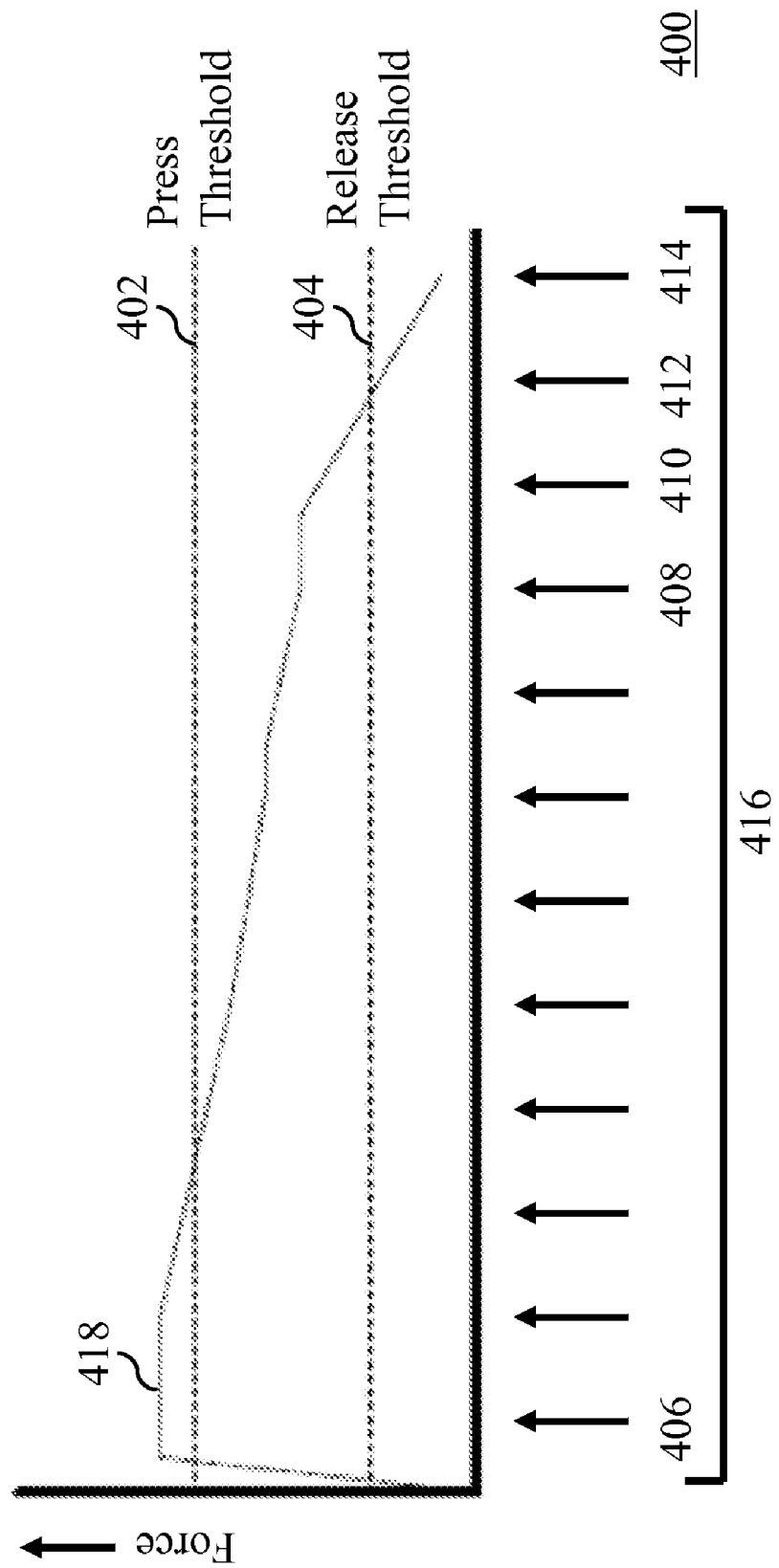
FIG. 4 shows a graph of a force applied on the continuous actuation button with respect to time in case of release due to fatigue, in accordance with an embodiment of the present invention.

FIG. 4 shows a graph 400 of a force applied on the continuous actuation button 210 with respect to time in case of release due to fatigue, in accordance with one embodiment. Those ordinarily skilled in the art would appreciate that the graph 400 can be represented in various other ways, different than that shown in FIG. 4. To describe the graph, reference will be made to FIG. 1 and FIG. 2.

The graph 400 shows a plot 418 of the force applied on the continuous actuation button 210 with time. The force applied is represented on the vertical axis and time on the horizontal axis. The graph 400 includes a press threshold 402 and a release threshold 404 on the vertical axis. The press threshold 402 corresponds to the first force threshold that is used to trigger a press event. The release threshold 404 corresponds to a second force threshold that is used to trigger a release event. For one embodiment, the press threshold 402 can be more than the release threshold 404. For another embodiment, the press threshold 402 can be equal to the release threshold 404. The graph 400 also includes an arrow 406, an arrow 408, an arrow 410, an arrow 412, an arrow 414 and other arrows, collectively referred to as arrows 416. The arrows 416 represent time instants at which the force applied on the continuous actuation button 210 has been sampled. In one arrangement, the adjacent time instants differ by a periodic time interval, although the duration of each time interval does not necessarily have to be equal. For one embodiment, the values of force applied may be obtained from a log of the force applied on the continuous actuation button 210.

As can be seen from the plot 418, at arrow 406 the force applied becomes more than the press threshold 402 thus triggering the press event. When the press event is triggered, the continuous actuation button 210 initiates the communication link. Thereafter, in the time period between arrow 406 and arrow 408, the force applied falls gradually and falls below the press threshold 402 but remains above the release threshold 404. Consequently, the communication link remains active during that time period. However, at arrow 410, the force applied almost reaches the release threshold 404. Between arrow 410 and arrow 412, the force applied falls below the release threshold 404, triggering the release event. As soon as the release event is triggered, the application processor 216 analyzes the log of the sampled force with respect to time. Examples of the analysis can include determining of the slope of the plot 418 before the release event, determining a percentage change in the force applied over the last two time instants and various other analyses. The determined value can be compared to a threshold value to determine whether the release was intentional or due to fatigue. As seen in FIG. 4, there is a gradual decrease in the force applied after arrow 308. Hence, the slope of the plot 418 between arrows 408 and 412 will be less than the threshold value for slope. Therefore, the release occurring in FIG. 4 can be classified by the application processor 216 as release due to fatigue. In this case, the application processor 216 can maintain the communication link for a predefined period of time. The predefined period of time can be monitored by using a timer. Further, the application processor 216 can activate the alert generator to alert a user of the communication device 102 regarding the occurrence of the release event. The user, upon noticing the alert, can increase the force applied on the continuous actuation button 210 to avoid discontinuation of the communication link. However, in case the user does not increase the force applied and the predefined period of time lapses, then the communication link is discontinued. At arrow 414, the force applied is still decreasing but it has not fallen to zero.

Figure 5:
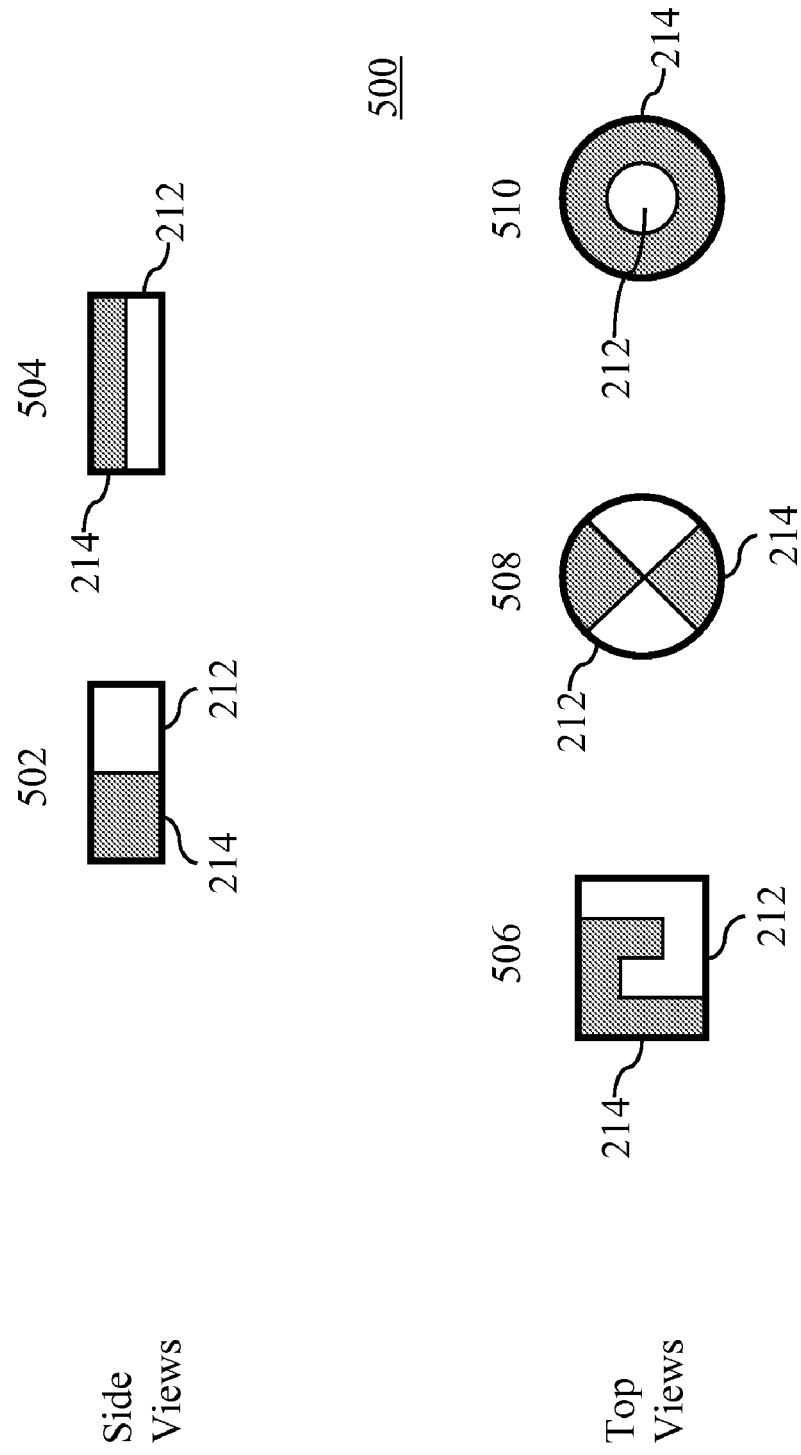
FIG. 5 illustrates various exemplary configurations of a user fatigue sensor including both a pressure sensitive device and a touch sensitive device, in accordance with various embodiments of the present invention.

FIG. 5 illustrates various exemplary configurations of the user fatigue sensor 228 including both, a pressure sensitive device and a touch sensitive device. It will be apparent to those ordinarily skilled in the art that the user fatigue sensor 228 can include all or even a fewer number of components than the components shown in FIG. 5. Further, those ordinarily skilled in the art will understand that the user fatigue sensor 228 can have various other suitable configurations not shown in FIG. 5.

The user fatigue sensor 228 can be arranged in configurations 502, 504, 506, 508 and 510 as shown in FIG. 5. Each of the configurations 502, 504, 506, 508 and 510 can include the pressure sensitive device 212 and the touch sensitive device 214. The configurations 502 and 504 show a side-view of the user fatigue sensor 228. In configuration 502, the pressure sensitive device 212 and touch sensitive device 214 can be arranged next to each other in the horizontal plane. Alternatively, in configuration 504, the pressure sensitive device 212 can be placed below the touch sensitive device 214. Further, the configurations 506, 508 and 510 show a top-view of the user fatigue sensor 228. In configuration 506, the pressure sensitive device 212 and touch sensitive device 214 can be arranged in an interlocked position. In configuration 508, the user fatigue sensor 228 can be round in shape with the pressure sensitive device 212 and the touch sensitive device 214 arranged in alternate quarters of the circle. In another arrangement, in configuration 510, the user fatigue sensor 228 is again circular in shape but the pressure sensitive device 212 can be circular and the touch sensitive device 214 can be arranged as a ring around the pressure sensitive device 212. In fact, virtually any other suitable configuration may be employed here, so long as the pressure sensitive device 212 and the touch sensitive device 214 are permitted to operate properly.

Figure 6:
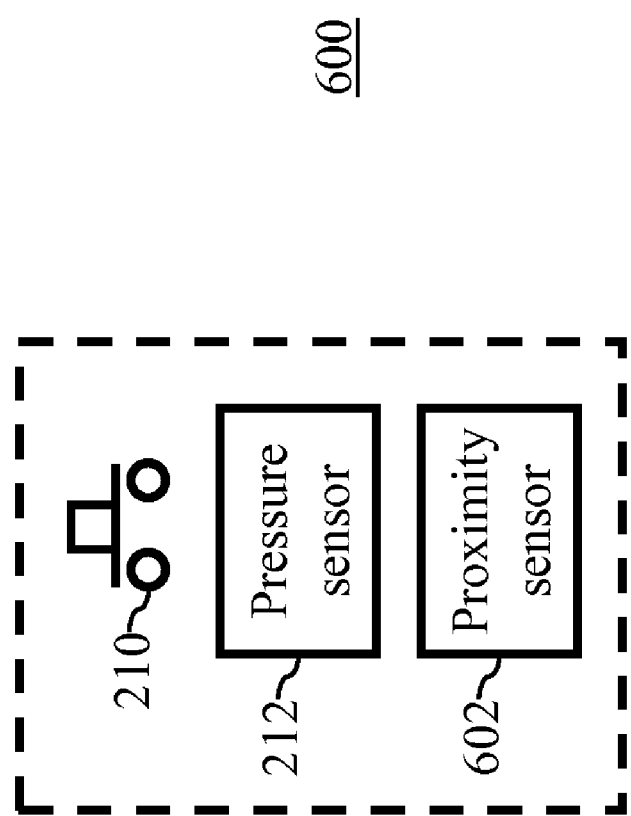
FIG. 6 illustrates a block diagram of a user fatigue sensor, in accordance with an embodiment of the present invention.

FIG. 6 illustrates a block diagram of an example of a user fatigue sensor 600. It will be apparent to those ordinarily skilled in the art that the user fatigue sensor 600 can include all or even a fewer number of components than the components shown in FIG. 6. Further, those ordinarily skilled in the art will understand that the user fatigue sensor 600 can include additional components that are not shown here, since they are not germane to the operation of the user fatigue sensor 600. To describe the user fatigue sensor 600, reference is made to FIG. 2 although it should be understood that the user fatigue sensor 600 can also be implemented in any other suitable device.

The user fatigue sensor 600 can include the continuous actuation button 210, the pressure sensitive device 212 and a proximity sensitive device 602. The user fatigue sensor 600 differs from the user fatigue sensor 228 in the replacement of the touch sensitive device 214 with the proximity sensitive device 602. The continuous actuation button 210 and the pressure sensitive device 212 perform the same functions as described in FIG. 2. The proximity sensitive device 602 can be coupled to the continuous actuation button 210. The proximity sensitive device 602 can determine whether a user is simply near the continuous actuation button 210. A proximity event can be registered when it is determined that the user is near the proximity sensitive device 602. In an exemplary scenario, the proximity event may be used to trigger the press event to initiate the communication link. After transmitting the data, the user releases the proximity sensitive device 602. The proximity sensitive device 602 then detects the release event based on the proximity of the finger of the user with the continuous actuation button 210. For example, the proximity sensitive device 602 will detect the release event when the user moves his/her finger away from the continuous actuation button 210. As an option, the proximity event can be followed by a physical press of the continuous actuation button 210, which can be detected by the pressure sensitive device 212, to initiate the press event.

Figure 7:
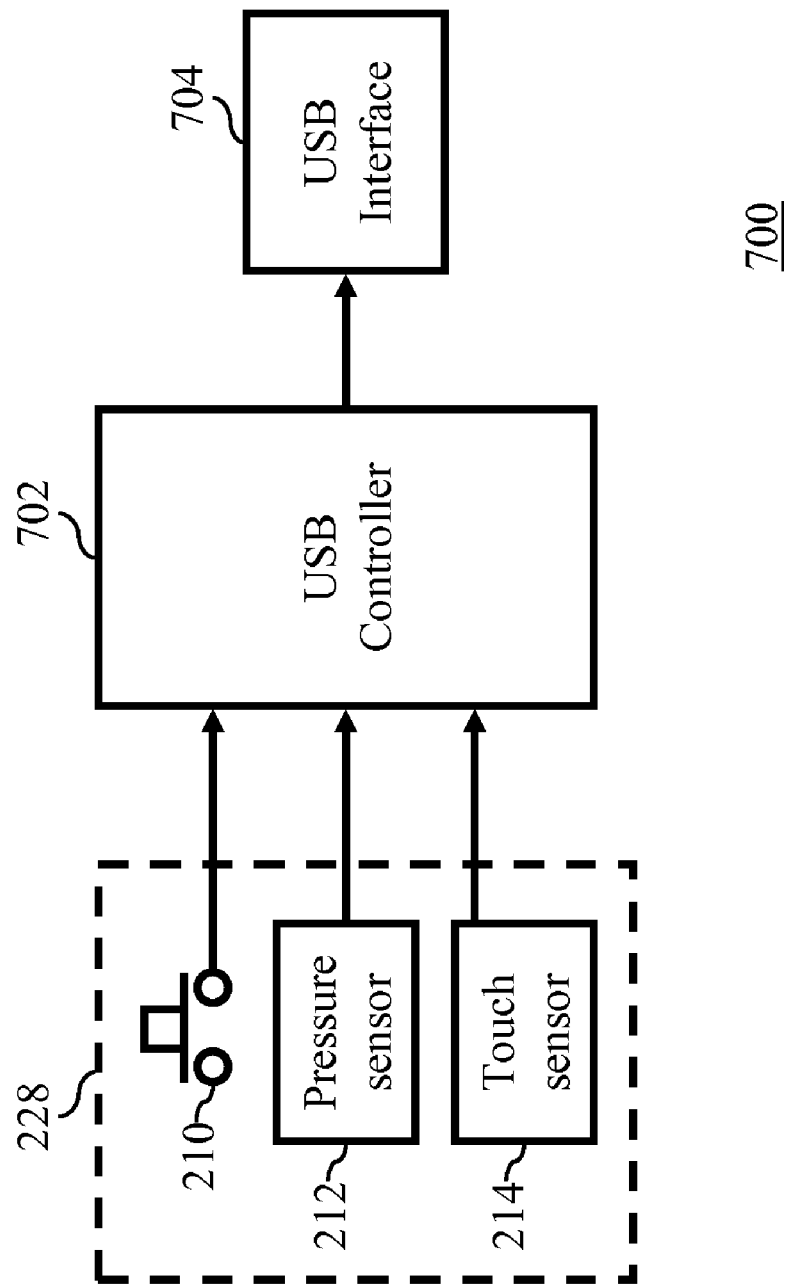
FIG. 7 illustrates a block diagram of a Universal Serial Bus (USB) controlled user fatigue sensor, in accordance with an embodiment of the present invention.

FIG. 7 illustrates a block diagram of a Universal Serial Bus (USB) enabled user fatigue sensor 700, in accordance with one embodiment. It will be apparent to those ordinarily skilled in the art that the USB enabled user fatigue sensor 700 can include all or even a fewer number of components than the components shown in FIG. 7. Further, those ordinarily skilled in the art will understand that the USB enabled user fatigue sensor 700 can include additional components that are not shown here, since they are not germane to the operation of the USB enabled user fatigue sensor 700. To describe the USB enabled user fatigue sensor 700, references are made to FIG. 2 although it should be understood that the USB enabled user fatigue sensor 700 can also be implemented in any other suitable device.

The USB enabled user fatigue sensor 700 can include the user fatigue sensor 228, a USB controller 702 and a USB interface 704. The user fatigue sensor 228 can include the continuous actuation button 210, the pressure sensitive device 212 and the touch sensitive device 214. The user fatigue sensor 228, the continuous actuation button 210, the pressure sensitive device 212 and the touch sensitive device 214 perform the same functions as described in FIG. 2. The USB controller 702 and the USB interface 704 can act as coupling elements between the continuous actuation button 210, the pressure sensitive device 212 and the touch sensitive device 214 and the application processor 216. The USB controller 702 can obtain data from continuous actuation button 210, the pressure sensitive device 212 and the touch sensitive device 214. The data obtained can be processed by the USB controller 702 before forwarding to the USB interface 704. The USB interface 704 can be coupled to the application processor 216. The USB interface can forward the processed data from the USB controller 702 to the application processor 216. Of course, it is important to note that other elements can be used to process and convey signals from the user fatigue sensor 228 to the application processor 216, including components capable of wireless transmission.

Figure 8:
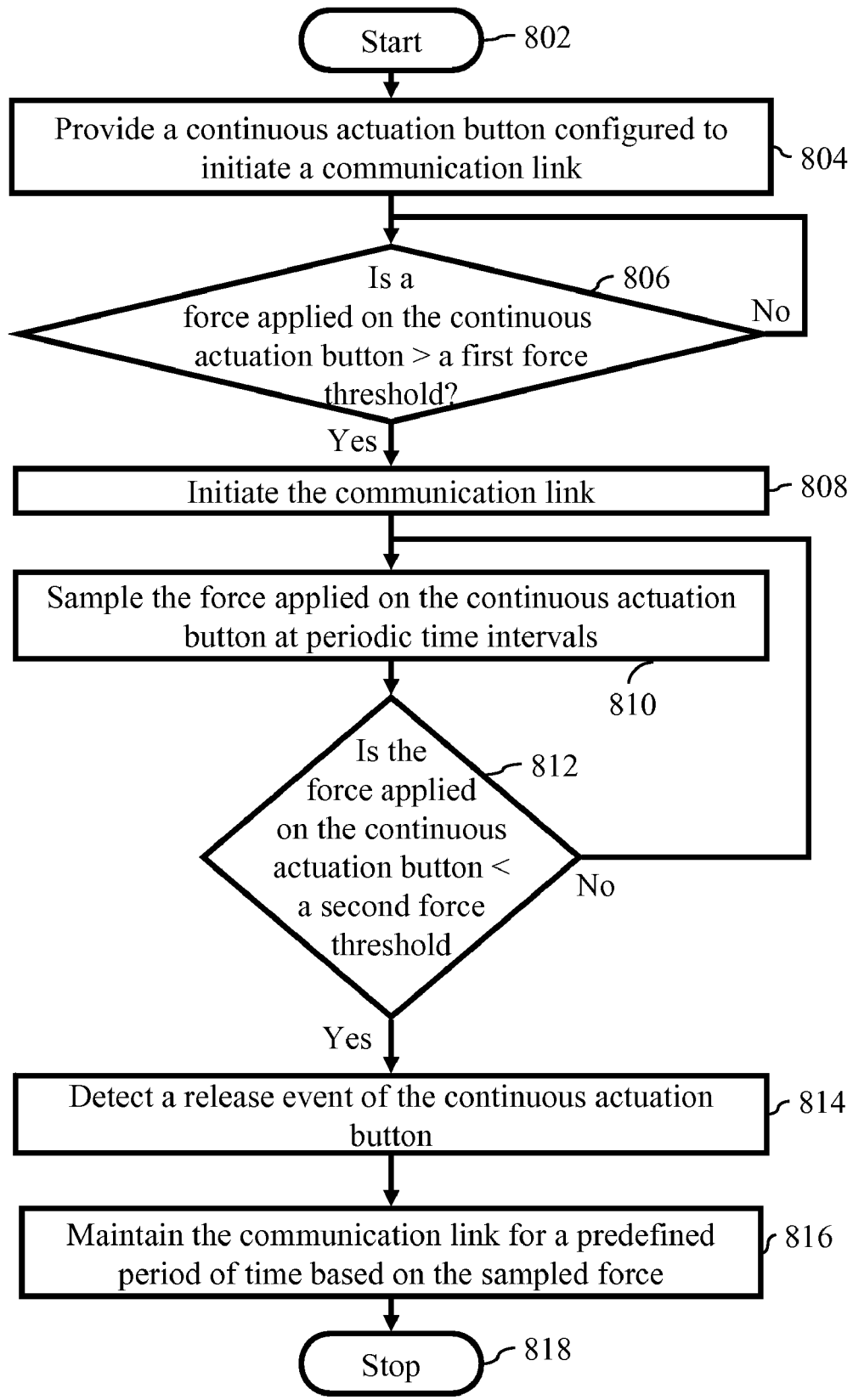
FIG. 8 illustrates a flow diagram of a method for managing a communication link in a communication network, in accordance with an embodiment of the present invention.

FIG. 8 illustrates a flow diagram of a method for managing a communication link in a communication network 100, in accordance with various embodiments of the present invention. The method enables exchange of data between a first communication device 102 and at least one second communication device in the communication network 100. To describe the flow diagram, reference will be made to FIG. 1 and FIG. 2, although it should be understood that the flow diagram can be implemented in any other suitable environment or network. Moreover, the invention is not limited to the order in which the steps have been listed in the flow diagram.

The method for managing the communication link in the communication network 100 is initiated at step 802. At step 804, a continuous actuation button is provided to initiate the communication link. For one embodiment, the continuous actuation button can be provided by the communication device 102. The continuous actuation button can correspond to the continuous actuation button 210. Further, the continuous actuation button 210 is configured to initiate the communication link between the first communication device 102 and the at least one second communication device in the communication network 100.

At step 806, it is determined whether a force applied on the continuous actuation button 210 is greater than a first force threshold. For one embodiment, the application processor 216 can be configured to determine whether the force applied on the continuous actuation button 210 is greater than the first force threshold. The force applied on the continuous actuation button 210 can be obtained from the pressure sensitive device 212. The first force threshold can also be referred to as a press threshold. Step 806 is repeated until the force applied on the continuous actuation button 210 is not greater than the first force threshold. However, if it is determined at step 806 that the force applied on the continuous actuation button 210 is greater than the first force threshold, step 808 is performed.

At step 808, the communication link between the communication device 102 and the at least one second communication device is initiated. For one embodiment, the communication link can be initiated by the continuous actuation button 210 through the application processor 216. The initiation of the communication link can also be referred to as activation of a Push-to-Talk (PTT) feature. The communication link enables the communication device 102 to exchange data with the communication devices 104-110.

At step 810, the force applied on the continuous actuation button 210 is sampled at periodic time intervals. For one embodiment, the application processor 216 can be configured to sample the force applied on the continuous actuation button 210 at periodic time intervals. The sampling of the force can include comparison of the force to threshold values, storing the force for future reference, analyzing the stored force values and the like. The periodic time intervals can be monitored by using a timer. The periodic time intervals may be predefined or customizable. Thereafter, the method flow proceeds to perform step 812.

At step 812, it is determined whether the force applied on the continuous actuation button 210 is less than a second force threshold. For one embodiment, the application processor 216 can be configured to determine whether the force applied on the continuous actuation button 210 is less than the second force threshold. The force applied on the continuous actuation button 210 can be obtained from the pressure sensitive device 212. The second force threshold can also be referred to as a release threshold. If it is determined at step 812 that the force applied on the continuous actuation button 210 is not less than the second force threshold, the method flow proceeds to step 810. However, if it is determined at step 812 that the force applied on the continuous actuation button 210 is less than the second force threshold, step 814 is performed.

At step 814, a release event of the continuous actuation button 210 is detected. For one embodiment, the application processor 210 can be configured to detect the release event of the continuous actuation button 210. The release event can be used as a trigger for other operations. Thereafter, the method flow proceeds to step 816.

At step 816, the communication link is maintained for a predefined period of time based on the sampled force. For one embodiment, the application processor 216 can be configured to maintain the communication link for a predefined period of time based on the sampled force. The sampling of the force can indicate whether a release was intentional or due to fatigue. The scenarios of intentional release and release due to fatigue have been discussed in detail in the description of FIG. 3 and FIG. 4. In an exemplary scenario, the type of release can be determined by analyzing the rate of decrease of the force applied, just before the release event was detected. For example, in case the rate of decrease is very high, then the release can be identified as an intentional release. On the other hand, when the rate of decrease is not very high, then the release can be identified as release due to fatigue. When an intentional release is determined, the communication link is discontinued. However, when a release due to fatigue is detected, the communication link is maintained for a predefined period of time. Further, the user is notified about the occurrence of the release event by generating an alert using an alert generator. The predefined period of time can be monitored by using the timer. Thereafter, the method terminates at step 818.

Figure 9:
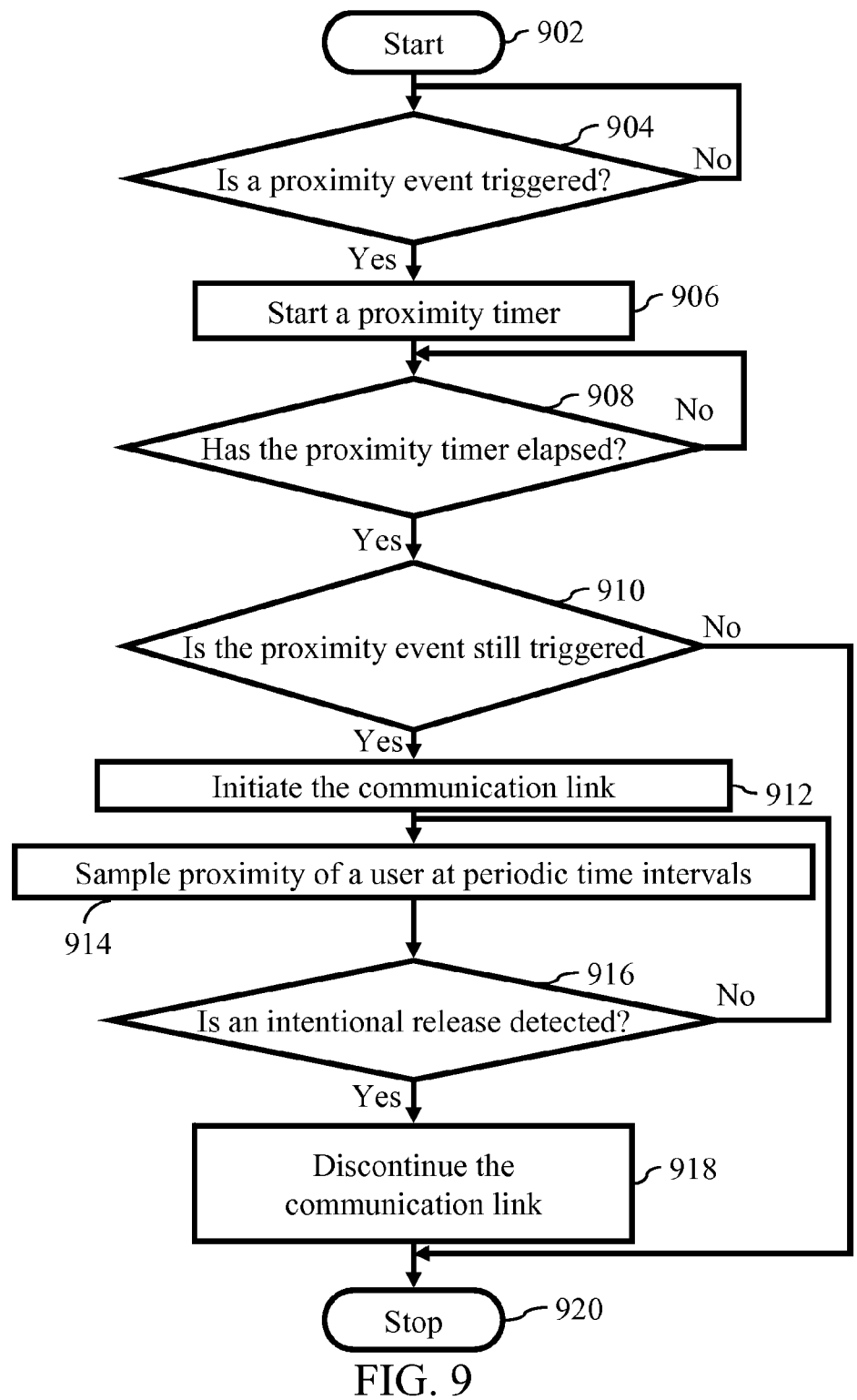
FIG. 9 illustrates a flow diagram of a method for managing a communication link in a communication network, in accordance with another embodiment of the present invention.

FIG. 9 illustrates a flow diagram of a method for managing a communication link in a communication network 100, in accordance with one embodiment. The method enables exchange of data between a first communication device 102 and at least one second communication device in the communication network 100. To describe the flow diagram, reference will be made to FIG. 1, FIG. 2, FIG. 6, and FIG. 8 although it should be understood that the flow diagram can be implemented in any other suitable environment or network. Moreover, the invention is not limited to the order in which the steps have been listed in the flow diagram.

The method for managing the communication link in the communication network is initiated at step 902. At step 904, it is determined whether a proximity event has been triggered. For one embodiment, the application processor 216 can determine whether the proximity event has been triggered. The proximity event can be triggered by the user fatigue sensor 600 when the proximity sensitive device 602 senses that a user is near the continuous actuation button 210. Step 904 is repeated, until it is determined at step 904 that the proximity event has been triggered. When it is determined, at step 904 that the proximity event has been triggered, step 906 is performed.

At step 906, a proximity timer is started. For one embodiment, the application processor 216 can be configured to start the proximity timer. The proximity timer can be set to run for a fixed duration of time. Thereafter, at step 908, it is determined whether the proximity timer has elapsed. For one embodiment, the application processor 216 can be configured to determine whether the proximity timer has elapsed. Step 908 is repeated until the proximity timer has elapsed. If it is determined at step 908 that the proximity timer has elapsed, step 910 is performed.

At step 910, it is determined whether the proximity event is still triggered. For one embodiment, the application processor 216 can be configured to determine whether the proximity event is still triggered. If it is determined at step 910 that the proximity event is not triggered, the method is terminated at step 920. However, if it is determined at step 910 that the proximity event is still triggered, step 912 is performed.

At step 912, the communication link is initiated. For one embodiment, the communication link can be initiated by, for example, the user fatigue sensor 600 through the application processor 216. The initiation of the communication link can also be referred to as activation of a Push-to-Talk (PTT) feature. The communication link enables the communication device 102 to exchange data with the communication devices 104-110.

At step 914, the proximity of the user to the user fatigue sensor 600 can be sampled at periodic time intervals. For one embodiment, the application processor 216 can be configured to sample the user's proximity at periodic time intervals through the proximity sensor 602. This sampling includes comparison of the proximity to threshold values, storing the proximity values for further reference, analyzing the stored proximity values and the like. The periodic time intervals can be monitored by using a timer. The periodic time intervals may be predefined or customizable. Thereafter, the method flow proceeds to step 916.

At step 916, it is determined whether an intentional release has been detected. For one embodiment, the application processor 216 can be configured to determine whether an intentional release has been detected, such as by determining that the user has moved too far away from the user fatigue sensor 600 to maintain the communication link. If it is determined at step 916 that the release is not intentional, the method flow goes back to step 914. However, if it is determined at step 916 that the release is intentional, step 918 is performed. At step 918, the communication link between the first communication device 102 and the at least one second communication device is discontinued. For one embodiment, the communication link can be discontinued by the application processor 216. The discontinuation of the communication link can also be referred to as deactivation of the PTT feature. Thereafter, the method terminates at step 920.

Figure 10:
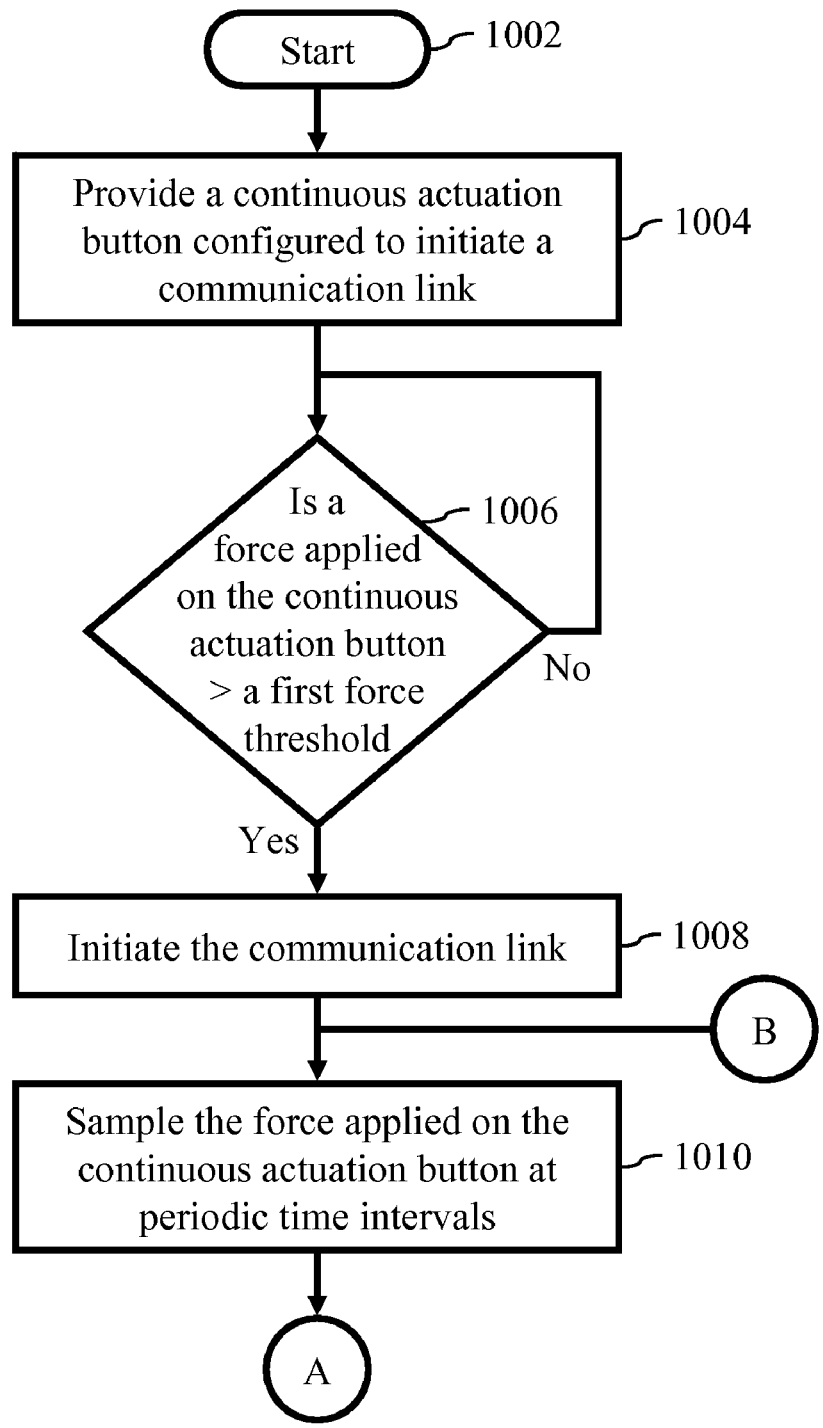
FIGS. 10, 11 and 12 illustrate a flow diagram of a method for managing a communication link in a communication network, in accordance with another embodiment of the present invention.
Figure 11:
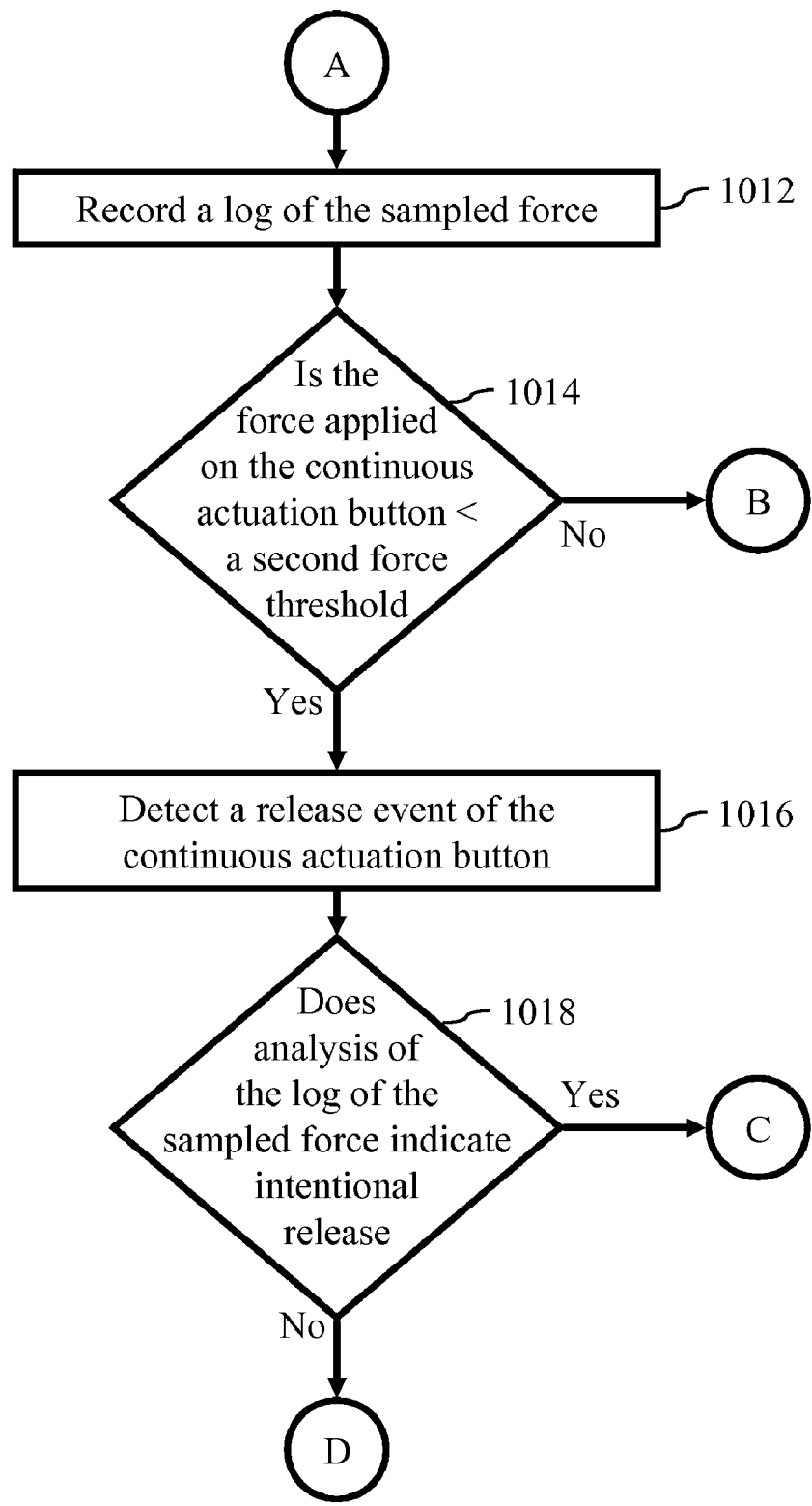
Figure 12:
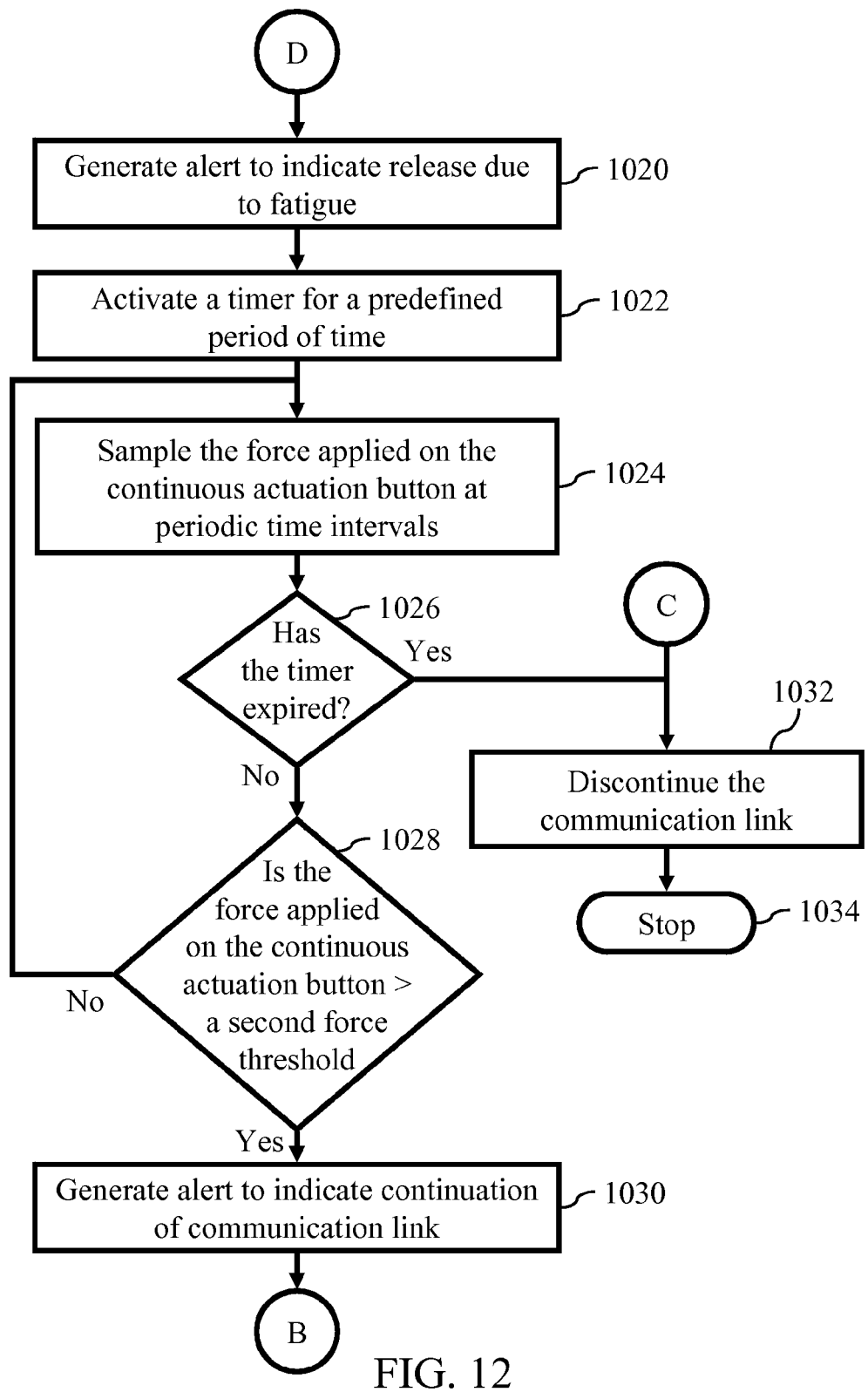

FIGS. 10, 11 and 12 illustrate a detailed flow diagram of a method for managing a communication link in a communication network 100, in accordance with another embodiment. The method enables exchange of data between a first communication device 102 and at least one second communication device in the communication network 100. To describe the flow diagram, references will be made to FIG. 1, FIG. 2, and FIG. 8, although it should be understood that the flow diagram can be implemented in any other suitable environment or network. Moreover, the invention is not limited to the order in which the steps have been listed in the flow diagram.

The method for managing the communication link in the communication network 100 is initiated at step 1002. At step 1004, a continuous actuation button is provided to initiate the communication link. In one embodiment, a force is applied at the continuous actuation button 210. At step 1006, it is determined whether a force applied on the continuous actuation button 210 is greater than a first force threshold. For one embodiment, the application processor 216 can be configured to determine whether the force applied on the continuous actuation button 210 is greater than the first force threshold. The force applied on the continuous actuation button 210 can be obtained from the pressure sensitive device 212. The first force threshold can also be referred to as a press threshold. Step 1006 is repeated until the force applied on the continuous actuation button 210 is greater than the first force threshold. If it is determined at step 1006 that the force applied on the continuous actuation button 210 is greater than the first force threshold, step 1008 is performed.

At step 1008, the communication link between the first communication device 102 and the at least one second communication device is initiated. For one embodiment, the communication link can be initiated by the continuous actuation button 210 through the application processor 216. The initiation of the communication link can also be referred to as activation of a Push-to-Talk (PTT) feature. The communication link enables the communication device 102 to exchange data with the communication devices 104-110. At step 1010, the force applied on the continuous actuation button 210 is sampled at periodic time intervals. For one embodiment, the application processor 216 can be configured to sample the force applied on the continuous actuation button 210 at periodic time intervals. The sampling of the force can include comparison of the force to threshold values, storing the force for future reference, analyzing the stored force values and the like. The periodic time intervals may be predefined or customizable. Thereafter, the method flow proceeds to step 1012 of FIG. 11.

At step 1012, a log of the sampled force is recorded. For one embodiment, the application processor 216 can be configured to record the log of the sampled force. The log of the sampled force can either be stored in the Random Access Memory (RAM) 218 or the flash memory 220. The log of sampled force includes force applied on the continuous actuation button 210 at periodic time intervals. The force applied is stored along with the corresponding time stamps to facilitate analysis of the applied force. At step 1014, it is determined whether the force applied on the continuous actuation button 210 is less than a second force threshold. For one embodiment, the application processor 216 can be configured to determine whether the force applied on the continuous actuation button 210 is less than the second force threshold. The force applied on the continuous actuation button 210 can be obtained from the pressure sensitive device 212. The second force threshold can also be referred to as a release threshold. If it is determined at step 1014 that the force applied on the continuous actuation button 210 is not less than the second force threshold, the method flow goes back to step 1010. However, if it is determined at step 1014 that the force applied on the continuous actuation button 210 is less than the second force threshold, step 1016 is performed.

At step 1016, a release event of the continuous actuation button 210 is detected. The release event can be used as a trigger for other operations. Thereafter, at step 1018, it is determined whether the analysis of the log of the sampled force indicates an intentional release of the continuous actuation button 210. For one embodiment, the application processor 216 can be configured to determine the analysis of the log of the sampled force indicates an intentional release of the continuous actuation button 210. The method of determining whether a release is intentional has been described in detail in FIG. 8. If it is determined at step 1018 that the release is intentional, the method flow proceeds to step 1032 of FIG. 12. At step 1032, the communication link between the first communication device 102 and the at least one second communication devices is discontinued. Thereafter, the method terminates at step 1034.

However, if it is determined at step 1018 that the release is not intentional, step 1020 of FIG. 12 is performed. At step 1020, an alert is generated to indicate release due to fatigue. For an embodiment, an alert generator can generate the alert to indicate release due to fatigue. The alert is generated to notify the user of the occurrence of the release event. In case the release was occurring due to fatigue, on noticing the alert, the user can increase the force applied on the continuous actuation button 210. By increasing the force, the user can avoid a break in the communication link due to fatigue. At step 1022, a timer is activated for a predefined period of time. For one embodiment, the application processor 216 can activate the timer for the predefined period of time. The predefined period of time is provided to the user to notice the alert generated at step 1020 and to take required action to avoid disconnection due to fatigue. The predefined period of time can be fixed or customizable. Thereafter, the method flow proceeds to step 1024.

At step 1024, the force applied on the continuous actuation button 210 is sampled at periodic time intervals. For one embodiment, the application processor 216 can be configured to sample the force applied on the continuous actuation button 210 at periodic time intervals. The periodic time intervals may be predefined or customizable. Thereafter, at step 1026, it is determined whether the timer has expired. For one embodiment, the application processor 216 can determine whether the timer has expired. If it is determined at step 1026 that the timer has not expired, step 1028 is performed. At step 1028, it is determined whether the force applied on the continuous actuation button 210 is greater than the second force threshold. For one embodiment, the application processor 216 can determine whether the force applied on the continuous actuation button 210 is greater than the second force threshold. The force applied on the continuous actuation button 210 can be obtained from the pressure sensitive device 212. If it is determined at step 1028 that the force applied on the continuous actuation button 210 is not greater than the second force threshold, the method flow goes back to step 1024. However, if it is determined at step 1028 that the force applied on the continuous actuation button 210 is greater than the second force threshold, then step 1030 is performed. At step 1030, an alert is generated to indicate continuation of the communication link. For one embodiment, the alert generator can generate the alert to indicate continuation of the communication link. Thereafter, the method flow proceeds to step 1010 of FIG. 10.

If it is determined at step 1026 that the timer has expired, the method flow proceeds to step 1032. At step 1032, the communication link between the first communication device 102 and the at least one second communication device is discontinued. The communication link can be discontinued by the continuous actuation button 210. The discontinuation of the communication link can also be referred to as deactivation of the PTT feature. Thereafter, the method is terminated at step 1034.

Figure 13:
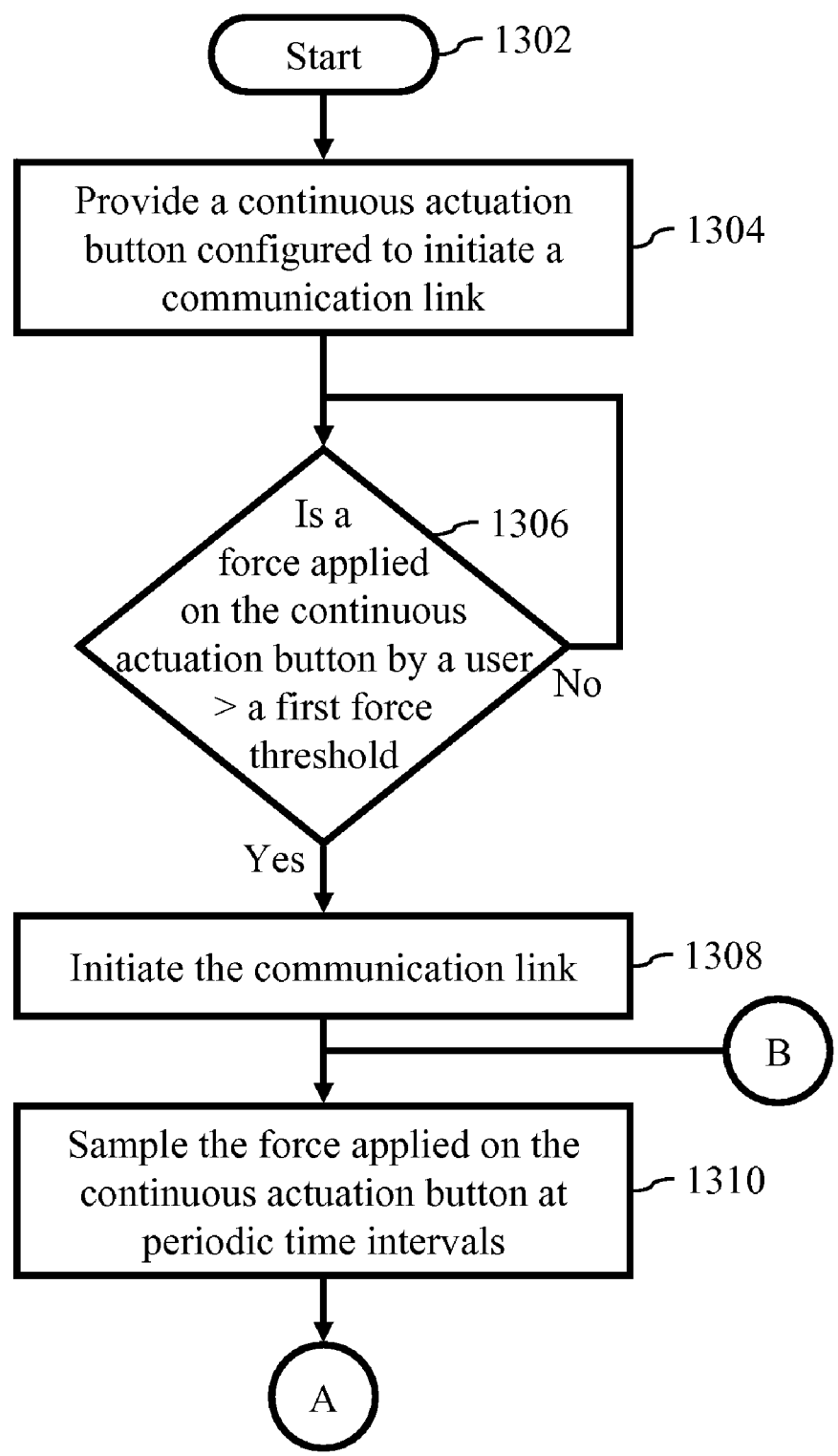
FIGS. 13, 14 and 15 illustrate a flow diagram of a method for managing a communication link in a communication network, in accordance with another embodiment of the present invention.
Figure 14:
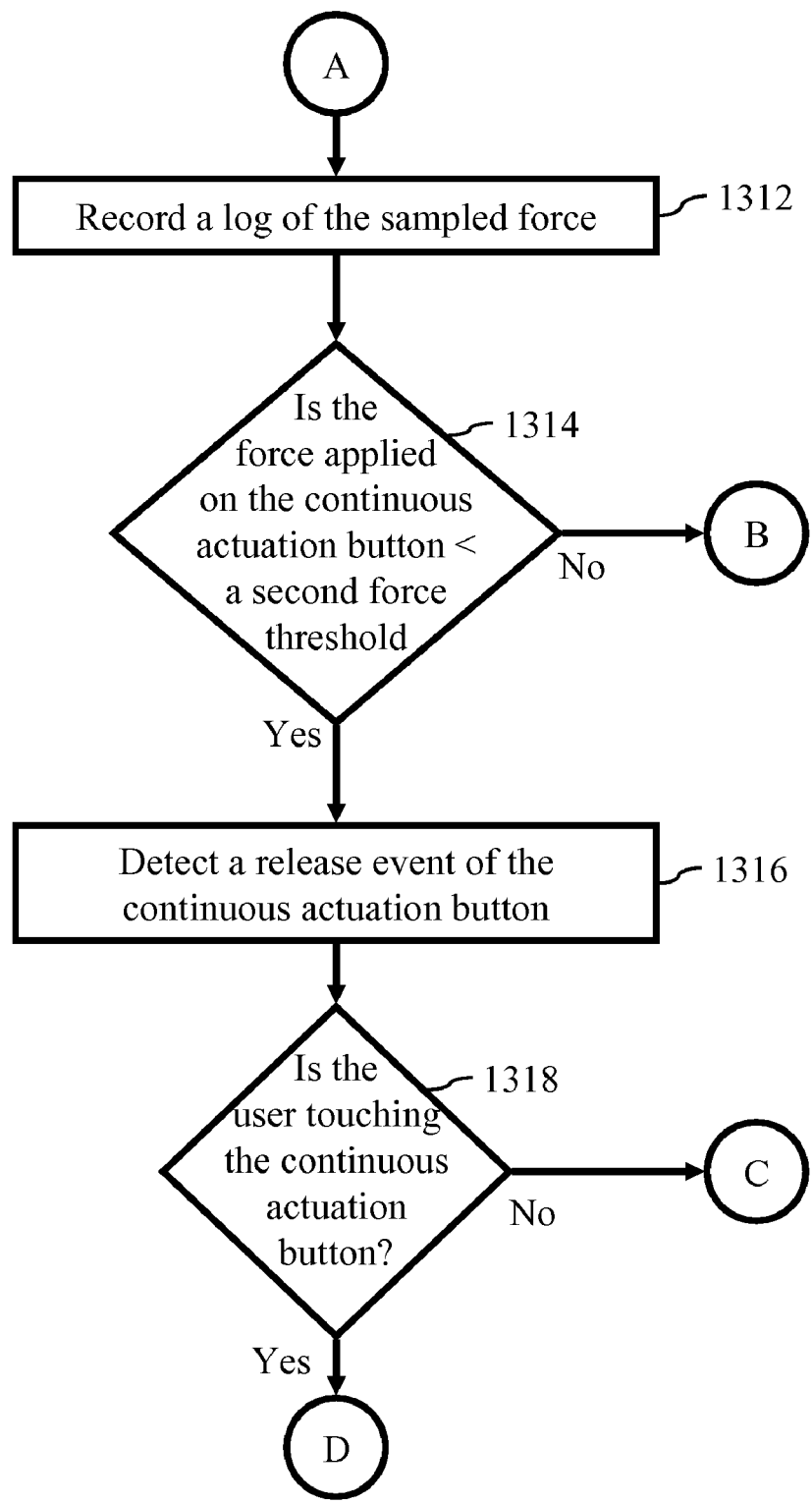
Figure 15:
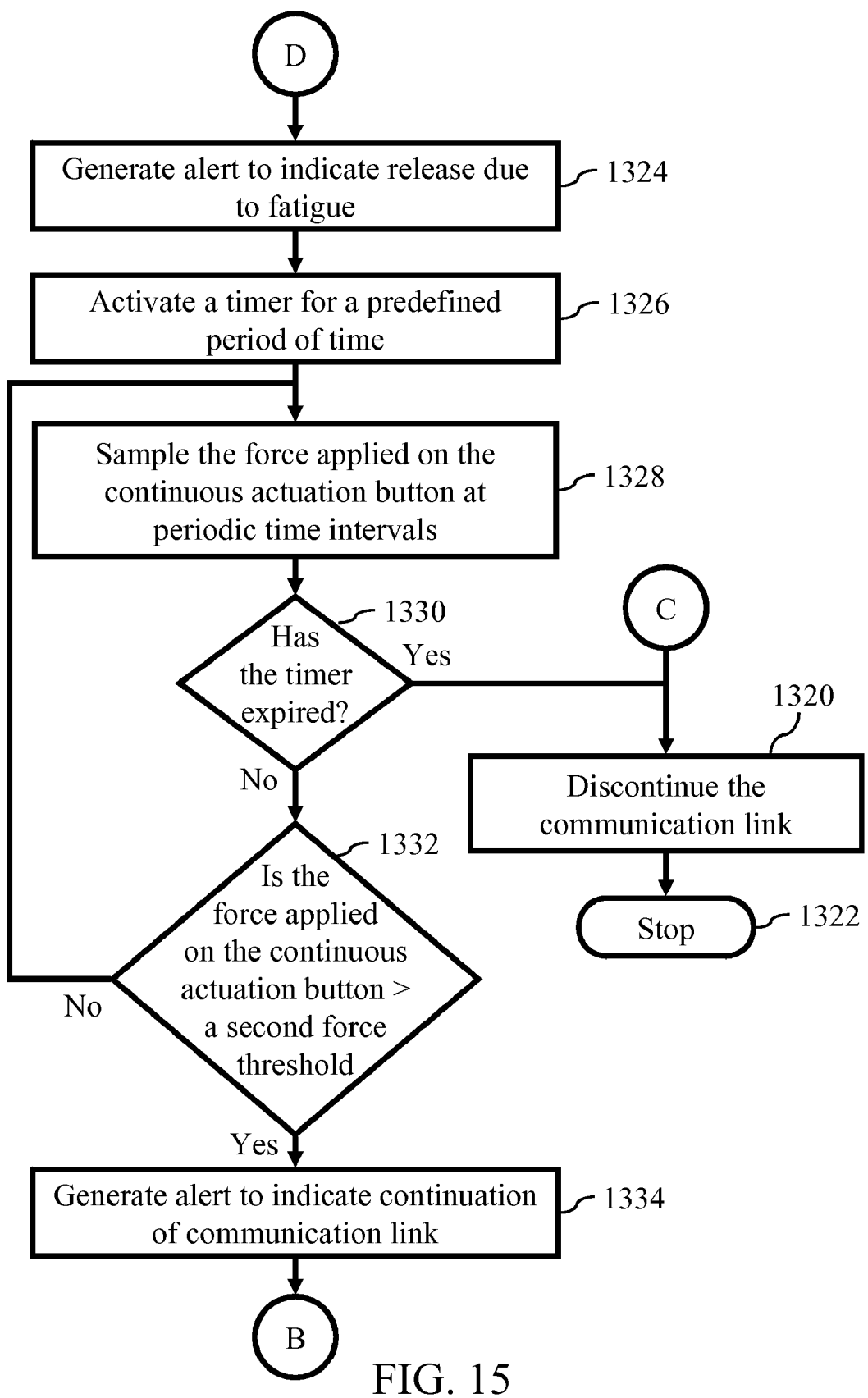

FIGS. 13, 14 and 15 illustrate a detailed flow diagram of a method for managing a communication link in a communication network 100, in accordance with another embodiment of the present invention. The method enables exchange of data between a first communication device 102 and at least one second communication device in the communication network 100. To describe the flow diagram, reference will be made to FIG. 1, FIG. 2, and FIGS. 8 and 9, although it should be understood that the flow diagram can be implemented in any other suitable environment or network. Moreover, the invention is not limited to the order in which the steps have been listed in the flow diagram.

The method for managing the communication link in the communication network 100 is initiated at step 1302. At step 1304, a continuous actuation button 210 is provided to initiate the communication link. In one embodiment, a force is applied on the continuous actuation button 210 of the first communication device 102. At step 1306, it is determined whether a force applied on the continuous actuation button 210 is greater than a first force threshold. Step 1306 is repeated until the force applied on the continuous actuation button 210 is greater than the first force threshold. When it is determined at step 1306 that the force applied on the continuous actuation button 210 is greater than the first force threshold, step 1308 is performed.

At step 1308, the communication link between the first communication device 102 and the at least one second communication device is initiated. The communication link can be initiated by the continuous actuation button 210 through the application processor 216. The initiation of the communication link can also be referred to as activation of a Push-to-Talk (PTT) feature. At step 1310, the force applied on the continuous actuation button 210 is sampled at periodic time intervals. Thereafter, at step 1312 of FIG. 14, a log of the sampled force is recorded. For one embodiment, the application processor 216 can be configured to record the log of the sampled force. The log of sampled force includes force applied on the continuous actuation button 210 at periodic time intervals. The force applied is stored along with the corresponding time stamps to facilitate analysis of the applied force. At step 1314, it is determined whether the force applied on the continuous actuation button 210 is less than a second force threshold. If it is determined at step 1314 that the force applied on the continuous actuation button 210 is not less than the second force threshold, the method flow goes back to step 1310 of FIG. 13. However, if it is determined at step 1314 that the force applied on the continuous actuation button 210 is less than the second force threshold, step 1316 is performed.

At step 1316, a release event of the continuous actuation button 210 is detected. For one embodiment, the application processor 210 can be configured to detect the release event of the continuous actuation button 210. The release event can be used as a trigger for other operations. Thereafter, the method flow proceeds to step 1318.

At step 1318, it is determined whether the user is touching the continuous actuation button 210. If it is determined at step 1318 that the user is not touching the continuous actuation button 210, the method flow proceeds to step 1320 of FIG. 15. At step 1320, the communication link between the first communication device 102 and the at least one second communication devices is discontinued. The method then terminates at step 1322. However, if it is determined at step 1318 that the user is touching the continuous actuation button 210, the method flow proceeds to step 1324.

At step 1324, an alert is generated to indicate release due to fatigue. For an embodiment, an alert generator can generate the alert to indicate release due to fatigue. The alert is generated to notify the user of the occurrence of the release event. In case the release was occurring due to fatigue, upon noticing the alert, the user can increase the force applied on the continuous actuation button 210. By increasing the force, the user can avoid a break in the communication link due to fatigue. At step 1326, a timer is activated for a predefined period of time. For one embodiment, the application processor 216 can activate the timer for the predefined period of time. The predefined period of time is provided to the user to notice the alert generated at step 1324 and to take required action to avoid disconnection due to fatigue. The predefined period of time can be fixed or customizable. Thereafter, the method flow proceeds to step 1328.

At step 1328, the force applied on the continuous actuation button 210 is sampled at periodic time intervals. For one embodiment, the application processor 216 can be configured to sample the force applied on the continuous actuation button 210 at periodic time intervals. The periodic time intervals can be monitored by the timer. Thereafter, at step 1330, it is determined whether the timer has expired. For one embodiment, the application processor 216 can determine whether the timer has expired. If it is determined at step 1330 that the timer has not expired, then at step 1332, it is determined whether the force applied on the continuous actuation button 210 is greater than the second force threshold. If it is determined at step 1332 that the force applied on the continuous actuation button 210 is not greater than the second force threshold, the method flow goes back to step 1328. However, if it is determined at step 1332 that the force applied on the continuous actuation button 210 is greater than the second force threshold, step 1334 is performed.

At step 1334, an alert is generated to indicate continuation of the communication link. The continuation of the communication link is indicated to the user to signal that the force applied is enough to maintain the communication link. For one embodiment, the alert generator can generate the alert to indicate continuation of the communication link. Thereafter, the method flow goes back to step 1310 of FIG. 13. If, at step 1330, it is determined that the timer has expired, the method flow proceeds to step 1320. At step 1320, the communication link is discontinued. For one embodiment, the communication link can be discontinued by the continuous actuation button 210 or by the application processor 216. The discontinuation of the communication link can also be referred to as deactivation of the PTT feature. Thereafter, the method terminates at step 1322.

Various embodiments of the present invention, as described above, provide a method and system for managing a communication link in a communication network. The present invention determines whether the communication link should be maintained between the communication devices when the continuous actuation button is released by the user. The communication link is maintained for a predetermined period of time, based on the nature of the release of the continuous actuation button. For example, the communication link is maintained for a predefined period of time when the continuous actuation button is accidentally released by the user. However, the user is alerted about the accidental release. The communication link is discontinued when the release is not accidental.

It will be appreciated that the method and system for maintaining a communication link in a communication network, described herein, may comprise one or more conventional processors and unique stored program instructions that control the one or more processors, to implement, in conjunction with certain non-processor circuits, some, most, or all of the functions of the system described herein. The non-processor circuits can include, but are not limited to, signal drivers, clock circuits, power-source circuits and user-input devices. As such, these functions may be interpreted as steps of a method for maintaining the communication link in the communication network. Alternatively, some or all the functions can be implemented by a state machine that has no stored program instructions, or in one or more application-specific integrated circuits (ASICs), in which each function, or some combinations of certain of the functions, are implemented as custom logic. Of course, a combination of the two approaches can also be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one of with ordinary skill in the art will appreciate that various modifications and changes can be made without departing from the scope of the present invention, as set forth in the claims. Accordingly, the specification and figures are to be regarded in an illustrative rather than a restrictive sense, and all such modifications are intended to be included within the scope of the present invention. The benefits, advantages, solutions to problems and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of those claims, as issued.

What is claimed is:

1. A method for managing a communication link in a communication network to enable exchange of data between a first communication device and at least one second communication device in the communication network, the method comprising the steps of:
    initiating the communication link through a continuous actuation button of the first communication device when an amount of force applied on the continuous actuation button exceeds a first force threshold;
    sampling the amount of force applied on the continuous actuation button, via a pressure sensor coupled to the continued actuation button, at predefined periodic time intervals;
    detecting a release event of the continuous actuation button when the amount of force applied on the continuous actuation button reaches below a second force threshold;
    determining whether the release event was intentional or unintentional;
    if the determination is that the release event was intentional, discontinuing the communication link; and
    if the determination is that the release event was unintentional, maintaining the communication link for a predefined period of time after detecting the release event, the predefined period of time sufficient to allow a user to take action to avoid an undesired disconnection.

2. The method as recited in claim 1 further comprising the step of maintaining the communication link responsive to the sampled amount of force moving above the second force threshold during the predefined period of time.

3. The method as recited in claim 1 further comprising recording a log of the sampled amount of force applied on the continuous actuation button at the periodic time intervals.

4. The method as recited in claim 3 further comprising analyzing the log of the sampled amount of force to determine whether the release event was intentional or unintentional, discontinuing the communication link, based on the analysis of the log of the sampled amount of force, if it is determined that the release event was intentional and maintaining the communication link for the predefined period of time, based on the analysis of the log of the sampled amount of force, if it is determined that the release event was unintentional.

5. The method as recited in claim 4 wherein analyzing the log of the sampled amount of force to determine whether the release event was intentional or unintentional comprises determining that the release event was unintentional when the analysis of the log shows a gradual decrease in the sampled amount of force applied over time and determining that the release event was intentional when the analysis of the log shows a sudden decrease in the sampled amount of force applied over time.

6. The method as recited in claim 1 further comprising generating an alert for a user of the first communication device to alert the user about the release event and indicate to the user that the communication link will be discontinued if the amount of force applied on the continuous actuation button is not subsequently increased.

7. The method as recited in claim 1, further comprising:
    determining whether a user is touching the continuous actuation button, via a touch sensor integrated with the continuous actuation button, and
    detecting the release event based on both (i) the touch or proximity of a finger of the user on or to the touch sensor and (ii) the amount of force applied on the continuous actuation button reaching below the second force threshold.

8. The method as recited in claim 1, further comprising:
    determining whether a user is touching the continuous actuation button, via a touch sensor integrated with the continuous actuation button, and
    detecting a second release event based on either, but not both, of (i) the amount of force applied on the continuous actuation button or (ii) the touch or proximity of a finger of the user on the touch sensor.

9. The method as recited in claim 8, wherein when the user is wearing gloves, the second release event is based on the amount of force applied on the continuous actuation button, and when the user is bare-handed, the second release event is based on the touch or proximity of the finger of the user on the touch sensor.

10. The method as recited in claim 1, further comprising permitting the user to customize the predefined period of time.

11. The method as recited in claim 1, wherein the second force threshold is a non-zero force threshold.

12. A communication device for managing a communication link in a communication network to enable exchange of data between a first communication device and at least one second communication device in the communication network, the communication device comprising:
- a continuous actuation button configured to initiate the communication link;
- a pressure sensor coupled to the continuous actuation button, the pressure sensor configured to detect an amount of force applied to the continuous actuation button, and to detect a release event at the continuous actuation button when the detected amount of force applied to the continuous actuation button falls below a first threshold level; and
- a processing device operable to:
  - sample the amount of force applied on the continuous actuation button, via the pressure sensor, at predefined periodic time intervals;
  - in response to the release event being detected, determine whether the release event was intentional or unintentional;
  - if the determination is that the release event was intentional, discontinue the communication link; and
  - if the determination is that the release event was unintentional, maintain the communication link for a predefined period of time after the release event, the predefined period of time sufficient to allow a user to take action to avoid an undesired disconnection.

13. The communication device as recited in claim 12, wherein the processing device is further operable to record a log of the sampled amount of force applied on the continuous actuation button at the periodic time intervals, and to determine whether the release event was intentional or unintentional by analyzing the log of the sampled amount of force, maintain the communication link for the predefined period of time if it is determined from the log that the release event was unintentional, and discontinue the communication link if it is determined from the log that the release event was intentional.

14. The communication device as recited in claim 12 further comprising an alert generator configured to alert a user of the first communication device regarding the release event and indicate to the user that the communication link will be discontinued if the amount of force applied on the continuous actuation button is not subsequently increased.

15. The communication device as recited in claim 12, further comprising a touch sensitive device integrated with the continuous actuation button.

16. The communication device as recited in claim 15, wherein the processing device is further operable to determine whether the release event was intentional or unintentional based on input from the pressure sensor and input from the touch sensor.

17. The communication device as recited in claim 16, wherein the processing device is further configured to:
- determine whether a user is touching the continuous actuation button, via the touch sensor, in addition to determining whether the user is applying the amount of force on the continuous actuation button, and
- detect a second release event based on either but not both the amount of force applied on the continuous actuation button or the touch or proximity of a finger of the user on or to the touch sensor.

18. The communication device as recited in claim 14, wherein the first threshold level is a non-zero threshold level.

* * * * *

UNITED STATES PATENT AND TRADEMARK OFFICE
CERTIFICATE OF CORRECTION

PATENT NO.        : 8,135,432 B2
APPLICATION NO.   : 11/958751
DATED             : March 13, 2012
INVENTOR(S)       : Pinder et al.

Page 1 of 1

It is certified that error appears in the above-identified patent and that said Letters Patent is hereby corrected as shown below:

On the title page, item (73), under "Assignee", in Column 1, Line 1, delete "Schaumberg," and insert -- Schaumburg --, therefor.

Signed and Sealed this
Eighteenth Day of December, 2012

David J. Kappos
*Director of the United States Patent and Trademark Office*